(12) United States Patent
Wiener et al.

(10) Patent No.: US 9,723,057 B2
(45) Date of Patent: Aug. 1, 2017

(54) REDUCING WEB PAGE LOAD LATENCY BY SCHEDULING SETS OF SUCCESSIVE OUTGOING HTTP CALLS

(71) Applicant: ORACLE INTERNATIONAL CORPORATION, Redwood Shores, CA (US)

(72) Inventors: David Abraham Wiener, Cupertino, CA (US); David Scott Gardner, San Jose, CA (US); John Patrick Connelly, Santa Cruz, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 90 days.

(21) Appl. No.: 14/694,787

(22) Filed: Apr. 23, 2015

(65) Prior Publication Data
US 2016/0094615 A1  Mar. 31, 2016

Related U.S. Application Data

(60) Provisional application No. 62/055,505, filed on Sep. 25, 2014.

(51) Int. Cl.
*G06F 15/16* (2006.01)
*H04L 29/08* (2006.01)
*G06F 17/30* (2006.01)

(52) U.S. Cl.
CPC ........ *H04L 67/02* (2013.01); *G06F 17/30893* (2013.01); *H04L 67/1095* (2013.01);
(Continued)

(58) Field of Classification Search
CPC ... H04L 67/325; H04L 67/02; H04L 67/1095; H04L 67/32; G06F 17/30893; G06F 17/30861
(Continued)

(56) References Cited

U.S. PATENT DOCUMENTS 5,787,254 A   7/1998  Maddalozzo, Jr. et al.
6,192,382 B1  2/2001  Lafer et al.
(Continued)

FOREIGN PATENT DOCUMENTS

CN  101004757  7/2007
CN  104584000  4/2015
(Continued)

OTHER PUBLICATIONS

5 Free Ways to Test Your Website Latency from Around the Globe, Activo-Magneto Development and POS Integration Activo, Oct. 7, 2010, 3 pages.
(Continued)

*Primary Examiner* — Kyung H Shin
(74) *Attorney, Agent, or Firm* — Kilpatrick Townsend & Stockton LLP

(57) ABSTRACT

A system, method, and computer program product for reducing web page load latency by scheduling sets of successive outgoing HTTP calls. Some embodiments commence upon receiving from a requesting client device, a request for content of a web page, wherein the content comprises two or more portions of dynamic content. Operations are performed to determine that the two or more portions of dynamic content are to be processed separately. A scheduling script to be executed by the requestor is generated and sent to the client device. The scheduling script comprises instructions to process a first subset of the two or more dynamic portions of content and also comprises instructions to process a second subset of the two or more portions of dynamic content. The scheduling script, when executed by requesting client device, causes the first subset of dynamic content and the second subset of dynamic content to be processed separately.

20 Claims, 19 Drawing Sheets

(52) U.S. Cl.
CPC ............ *H04L 67/32* (2013.01); *H04L 67/325* (2013.01); *G06F 17/30861* (2013.01)

(58) Field of Classification Search
USPC .................................. 709/217, 203; 715/234
See application file for complete search history.

(56) References Cited

U.S. PATENT DOCUMENTS

| | | | |
|---|---|---|---|
| 6,992,983 | B1 | 1/2006 | Chatterjee |
| 7,440,953 | B2 | 10/2008 | Sidman |
| 8,032,626 | B1 | 10/2011 | Russell et al. |
| 8,356,247 | B2 | 1/2013 | Krassner et al. |
| 8,706,871 | B2 | 4/2014 | Wiener et al. |
| 8,930,533 | B2 | 1/2015 | Wiener et al. |
| 9,231,858 | B1 | 1/2016 | Greifeneder et al. |
| 2004/0107267 | A1 | 6/2004 | Donker et al. |
| 2004/0215768 | A1 | 10/2004 | Oulu et al. |
| 2005/0197164 | A1 | 9/2005 | Chan et al. |
| 2007/0192701 | A1 | 8/2007 | Joines et al. |
| 2007/0271375 | A1 | 11/2007 | Hwang |
| 2007/0283036 | A1 | 12/2007 | Dey et al. |
| 2008/0155340 | A1 | 6/2008 | Tsun |
| 2008/0275980 | A1 | 11/2008 | Hansen |
| 2009/0106099 | A1 | 4/2009 | Chow et al. |
| 2010/0088411 | A1 | 4/2010 | Litofsky et al. |
| 2010/0095155 | A1 | 4/2010 | Tsun |
| 2011/0083031 | A1 | 4/2011 | Khunteta |
| 2011/0197124 | A1* | 8/2011 | Garaventa ......... G06F 17/30893 715/234 |
| 2011/0302235 | A1 | 12/2011 | Monk et al. |
| 2012/0030338 | A1 | 2/2012 | Zhang et al. |
| 2012/0143693 | A1 | 6/2012 | Chung et al. |
| 2012/0144288 | A1 | 6/2012 | Caruso et al. |
| 2014/0025807 | A1 | 1/2014 | Wiener et al. |
| 2014/0189113 | A1 | 7/2014 | Wiener et al. |
| 2015/0026239 | A1* | 1/2015 | Hofmann et al. .. H04L 67/1095 709/203 |
| 2015/0229553 | A1 | 8/2015 | Wiener et al. |

FOREIGN PATENT DOCUMENTS

| | | |
|---|---|---|
| EP | 2875444 A1 | 5/2015 |
| JP | 2003157173 | 5/2003 |
| JP | 2004206634 | 7/2004 |
| JP | 2006195709 | 7/2006 |
| JP | 2015530639 | 10/2015 |
| RU | 2015101336 | 9/2016 |
| WO | 2014015025 | 1/2014 |

OTHER PUBLICATIONS

U.S. Appl. No. 13/554,500, Notice of Allowance mailed on Jan. 17, 2014, 9 pages.
U.S. Appl. No. 14/415,936, Non-Final Office Action mailed on Oct. 27, 2016, 8 pages.
Chinese Application No. 201380043389.1, Office Action mailed on Dec. 5, 2016, 14 pages (6 pages for the original document and 8 pages for the English translation).
Cook, Tag Man Latency test, public report, Apr. 2009, 11 pages.
European Application No. 13819625.8, Extended European Search Report mailed on Feb. 29, 2016, 8 pages.
European Application No. 13819625.8, Office Action mailed on Mar. 20, 2017, 7 pages.
International Application No. PCT/US2013/050867, International Preliminary Report on Patentability mailed on Jan. 29, 2015, 6 pages.
International Application No. PCT/US2013/050867, International Search Report and Written Opinion mailed on Nov. 26, 2013, 7 pages.
Japanese Application No. JP2015-523220, Office Action mailed on Apr. 4, 2017, 3 pages.
U.S. Appl. No. 14/415,936 , Notice of Allowance mailed on May 8, 2017, 9 pages.

* cited by examiner

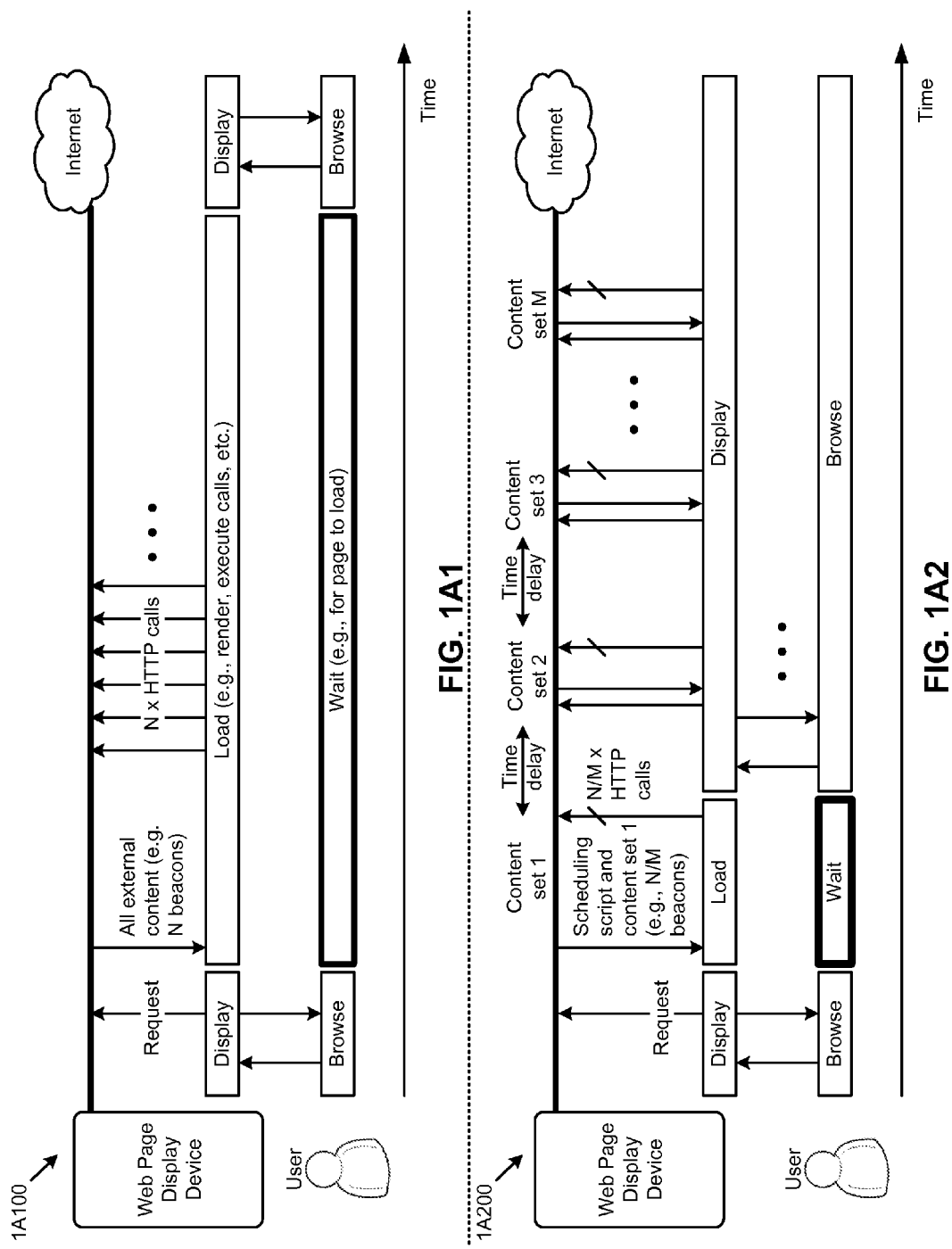

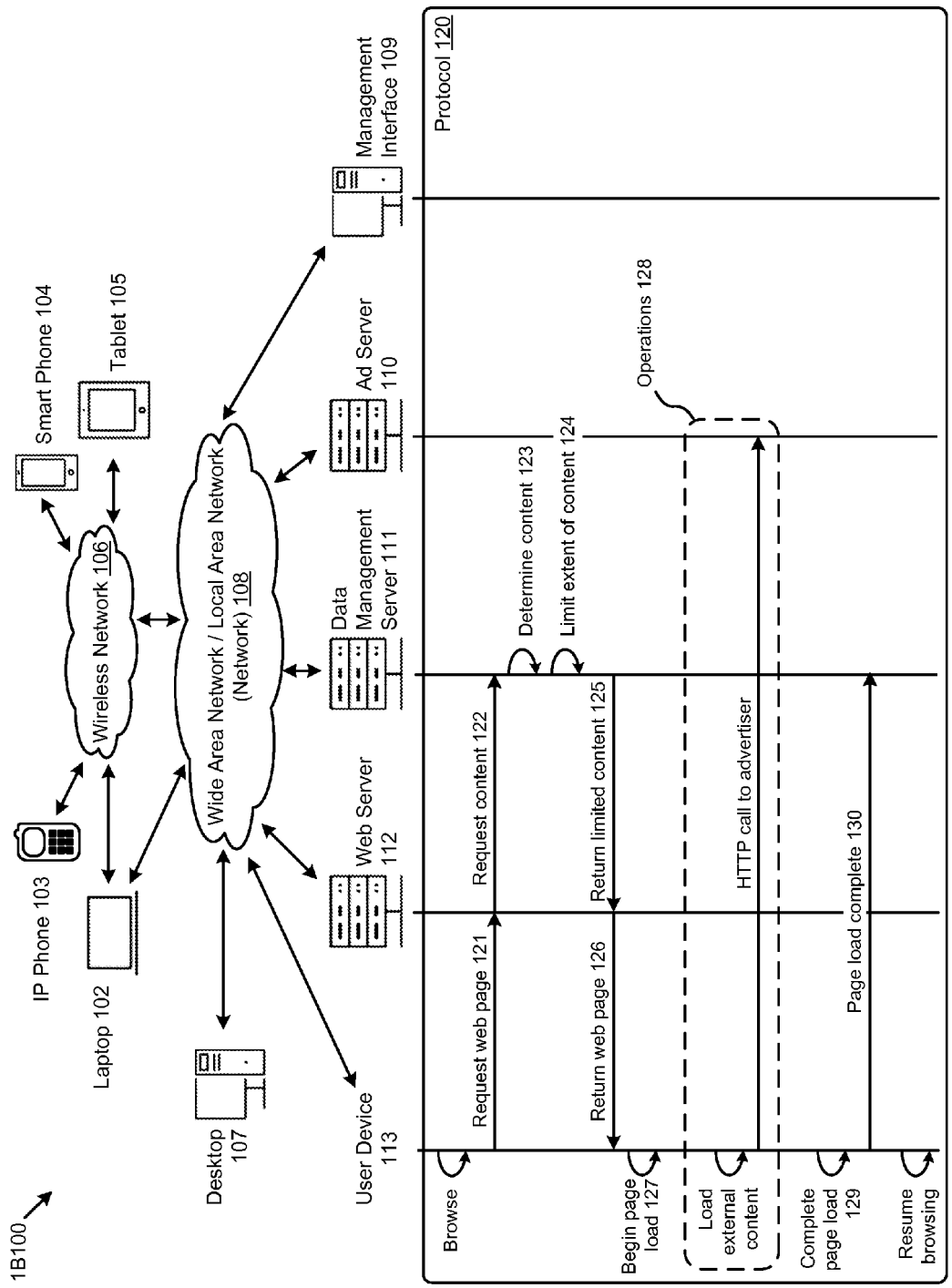
FIG. 1B1

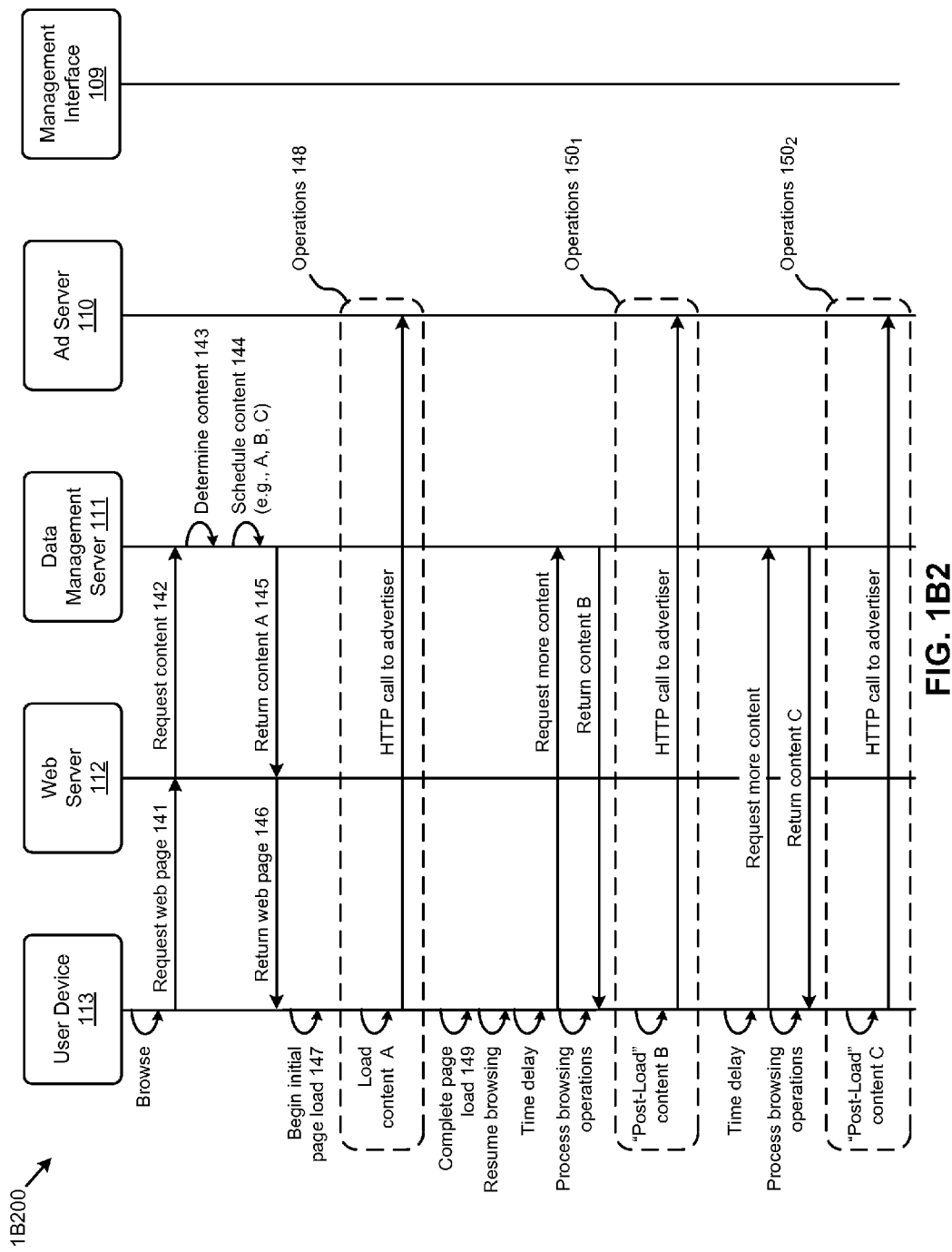
FIG. 1B2

FIG. 2C

Full Set of Content 250

```
<div id="new_content"/>
<img src="http://ads.company1.com/beacon?id=1" width=1 height=1>
<img src="http://ads.company2.com/beacon?id=2" width=1 height=1>
<img src="http://ads.company3.com/beacon?id=3" width=1 height=1>
<img src="http://ads.company4.com/beacon?id=4" width=1 height=1>
<img src="http://ads.company5.com/beacon?id=5" width=1 height=1>
...
<img src="http://ads.company60.com/beacon?id=60" width=1 height=1>
</div>
```

2C00

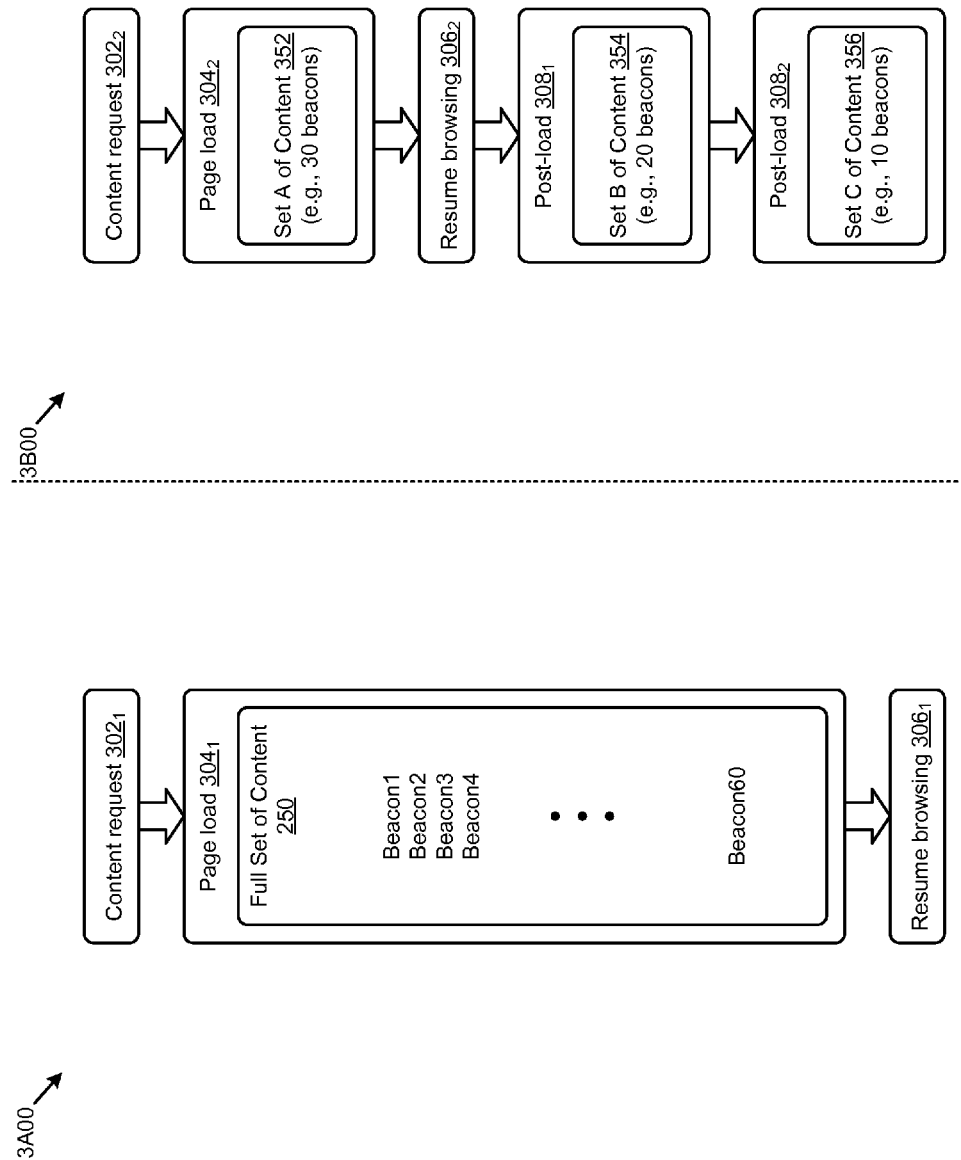

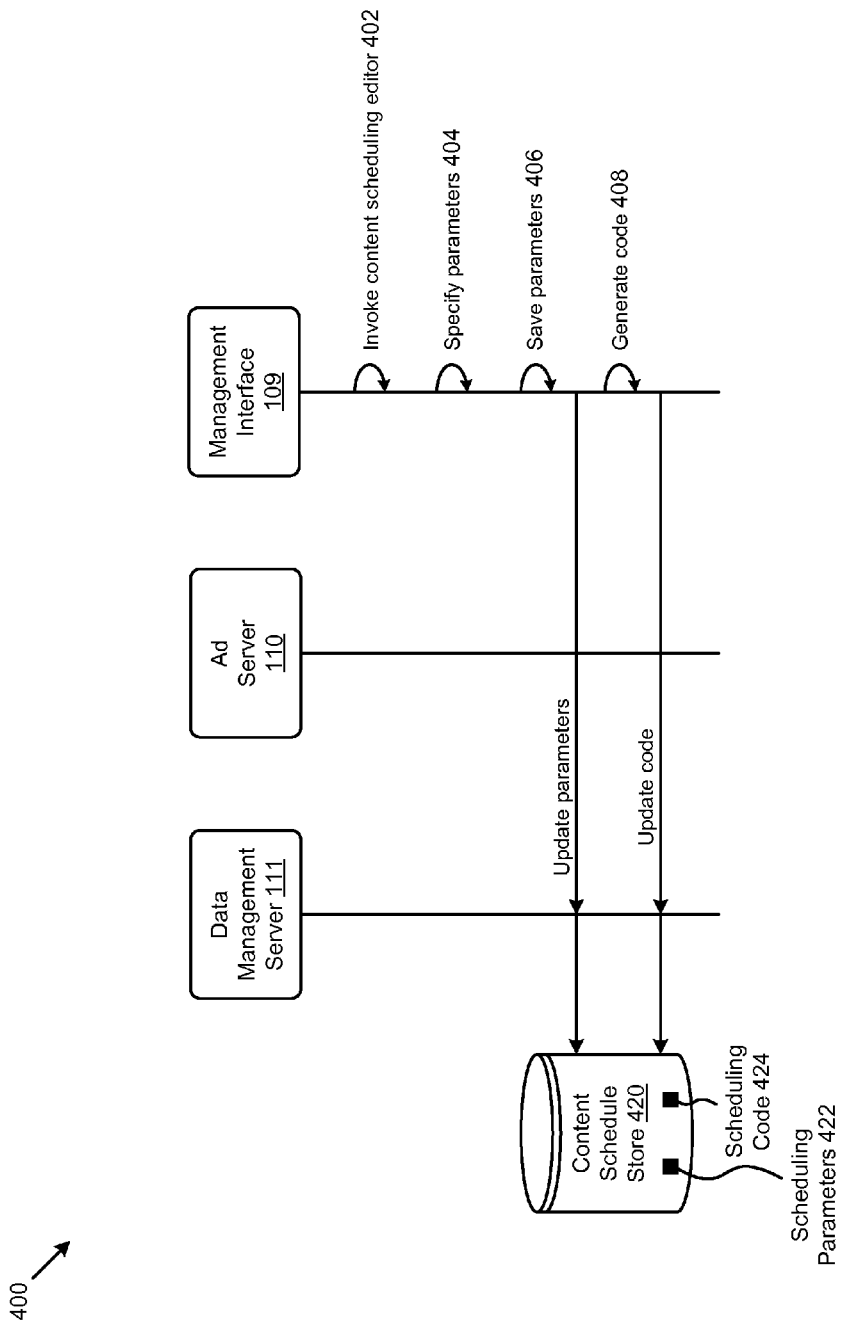

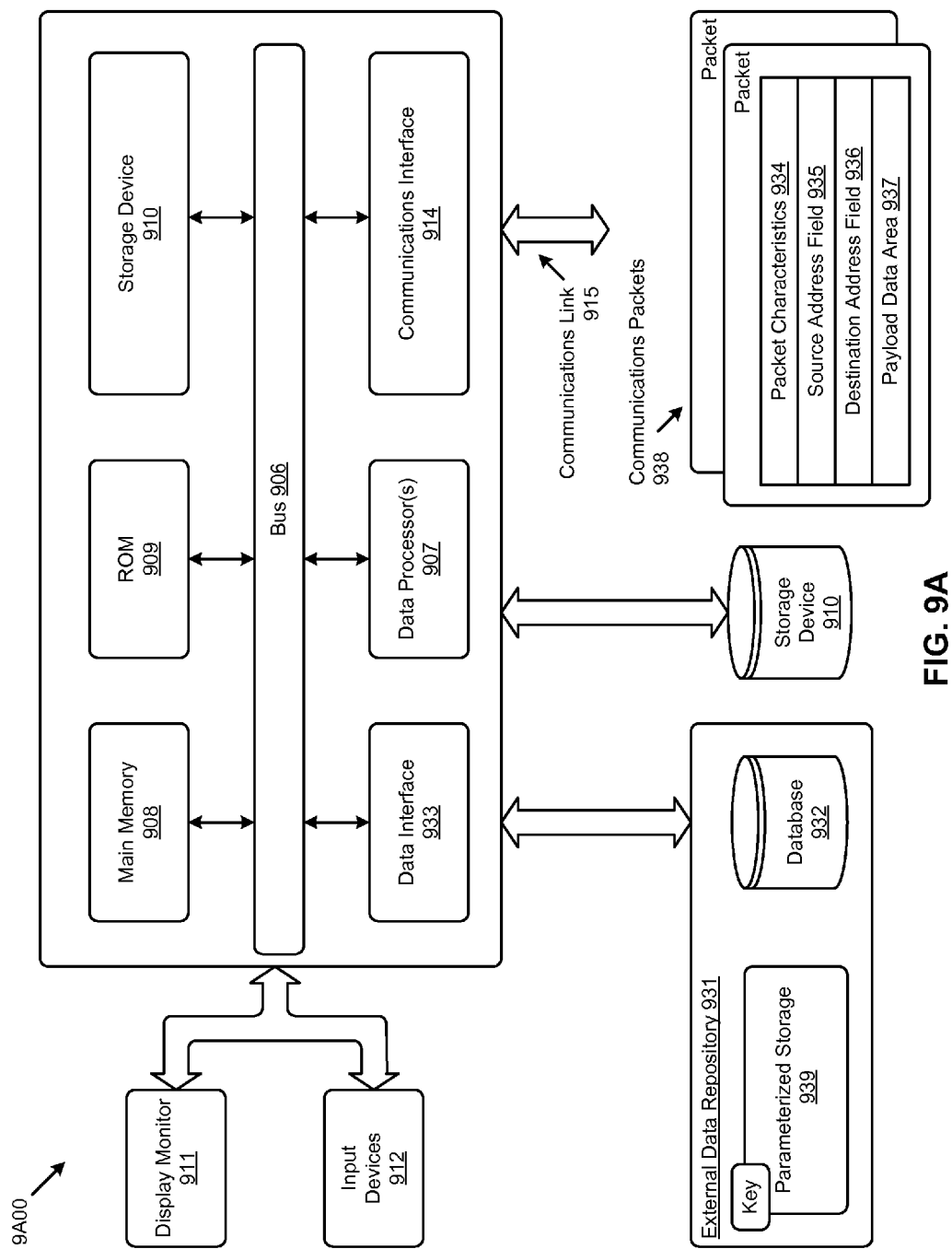

REDUCING WEB PAGE LOAD LATENCY BY SCHEDULING SETS OF SUCCESSIVE OUTGOING HTTP CALLS

RELATED APPLICATIONS

The present application claims the benefit of priority to U.S. Provisional Patent Application Ser. No. 62/055,505, entitled "REDUCING WEB PAGE LOAD LATENCY BY SCHEDULING SETS OF SUCCESSIVE OUTGOING HTTP CALLS", filed Sep. 25, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of managing internet beacon signal interaction with a web page, and more particularly to techniques for reducing web page load latency by scheduling sets of successive outgoing beacon signals.

BACKGROUND

A web page may comprise a mix of relatively "static portions of content" that are intended to be presented for all viewers of the page regardless of how they arrived at the page. A web page can also comprise relatively "dynamic portions of content" that are retrieved and/or generated and/or composed in response to browsing activities. For example, when a browsing user visits a web page of a content publisher or provider (e.g., HTTP://www.news.com), the content provider presents relatively static portions of the web page (e.g., headlines, lead articles, etc.), intermixed with relatively dynamic portions of the web page (e.g., ads, beacons, hyperlinks, etc.). Processing resources demanded and processing time incurred for rendering (e.g., processing web page markup code for execution and display to a user's display terminal) can be deterministic. For example, when a web page is comprised of purely static portions of content rendering performance can be predicted quite accurately. However, rendering resources and time incurred can vary widely, for example, when a web page includes dynamic portions of content. When a web page is comprised of many dynamic portions of content, the likelihood of incurring rendering latency increases. In some cases incurring rendering latency detracts from a user's experience. More specifically, one or more dynamic portions of the web page may be based on the user's browsing activities, and performance of such browsing activities may incur latency. In some cases, ads or beacons or hyperlinks or other information comprising the dynamic content may be selected and/or composed in real time by an external or third party provider (e.g., an ad data provider). In some cases, the content may be composed with respect to matches between user demographics and/or other information that can be known about the user in conjunction with any of various characteristics of an advertiser's campaign.

The actions involved in the foregoing can be accomplished by carrying out a computer-to-computer exchange of messages over a network. For example, the content provider may place some code (e.g., one or more beacons) in the web page markup document (e.g., HTML document) such that whenever the web page is loaded for viewing in a browser and/or the user interacts with the web page (e.g., the user clicks an ad, hovers over an ad, etc.), the code sends information (e.g., using HTTP calls, using IMAP calls, etc.) to advertisers who might want to present an ad or banner or other sort of message to that particular user, and/or collect information about the user (e.g., user interests as pertaining to the presented web page).

There can be any number of advertisers who are interested in knowing about the activity associated with a browsing session by a person having certain attributes, and any or all of such advertisers might want to have their respective code (e.g., beacons) included in the web page. Unfortunately, the technological limitations of the legacy approaches for including specific content for multiple advertisers in a given web page introduces undesirable latency during processing (e.g., loading, parsing, displaying, etc.) of the fully-composited web page to the user. Such latency—especially in cases when there are many potentially interested advertisers—can detract from the user browsing experience at the web page of the content provider. In cases where there is a very large number of advertisers that want to have beacons included in the web page, the latency can be long, and can severely detract from the user browsing experience.

Techniques are needed to address the problem of including content from multiple advertisers in a browsing session or web page while managing web page load latency so as to avoid detracting from the user experience. Specifically, improved techniques and, in particular, addressing the deficiencies of legacy technologies are needed to address the problem of long latencies for loading of web pages issuing a large number of advertiser HTTP calls. Improvements to the applications and efficiencies of technologies are needed.

SUMMARY

The present disclosure provides improved systems, methods, and computer program products suited to address the aforementioned issues with legacy approaches. More specifically, the present disclosure provides a detailed description of techniques used in systems, methods, and in computer program products for reducing web page load latency by scheduling sets of successive outgoing HTTP calls. More specifically, certain embodiments are directed to technological solutions for scheduling and delivering web page content beacon signals (e.g., advertiser beacons invoking HTTP calls) such that rendering of the web page is not subjected to undue latency. Various embodiments advance the technical fields for addressing the problem of long latencies for loading of web pages. The disclosed embodiments modify and improve over conventional approaches. Some embodiments disclosed herein use techniques to improve the functioning of multiple systems within the disclosed environments, and some embodiments advance peripheral technical fields as well.

Some embodiments commence upon receiving from a requesting client device, a request for content of a web page, wherein the content comprises two or more portions of dynamic content. Operations are performed to determine that the two or more portions of dynamic content are to be processed separately. A scheduling script to be executed by the requestor is generated and sent to the client device. The scheduling script comprises instructions to process a first subset of the two or more dynamic portions of content and also comprises instructions to process a second subset of the two or more portions of dynamic content, The scheduling script, when executed by requesting client device, causes the first subset and the second subset to be processed non-concurrently such that at least the first subset is processed even before the second subset is retrieved.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A1 and FIG. 1A2 present before-and-after comparison diagrams illustrating the effect of reducing web page load latency by scheduling sets of successive outgoing HTTP calls.

FIG. 1B1 is an environment illustrating the need for reducing web page load latency by scheduling sets of successive outgoing HTTP calls.

FIG. 1B2 is a protocol used by systems for reducing web page load latency by scheduling sets of successive outgoing HTTP calls, according to an embodiment.

FIG. 2C shows example content as used in systems for reducing web page load latency by scheduling sets of successive outgoing HTTP calls, according to an embodiment.

FIG. 3A and FIG. 3B present flow diagrams illustrating the scheduling of sets of content comprising a full set of content as used in systems for reducing web page load latency by scheduling sets of successive outgoing HTTP calls, according to an embodiment.

FIG. 4 presents a protocol for establishing and observing content scheduling parameters as used in systems for reducing web page load latency by scheduling sets of successive outgoing HTTP calls.

FIG. 9A, FIG. 9B, and FIG. 9C depict exemplary architectures of components suitable for implementing embodiments of the present disclosure, and/or for use in the herein-described environments.

DETAILED DESCRIPTION

Figure 2A:
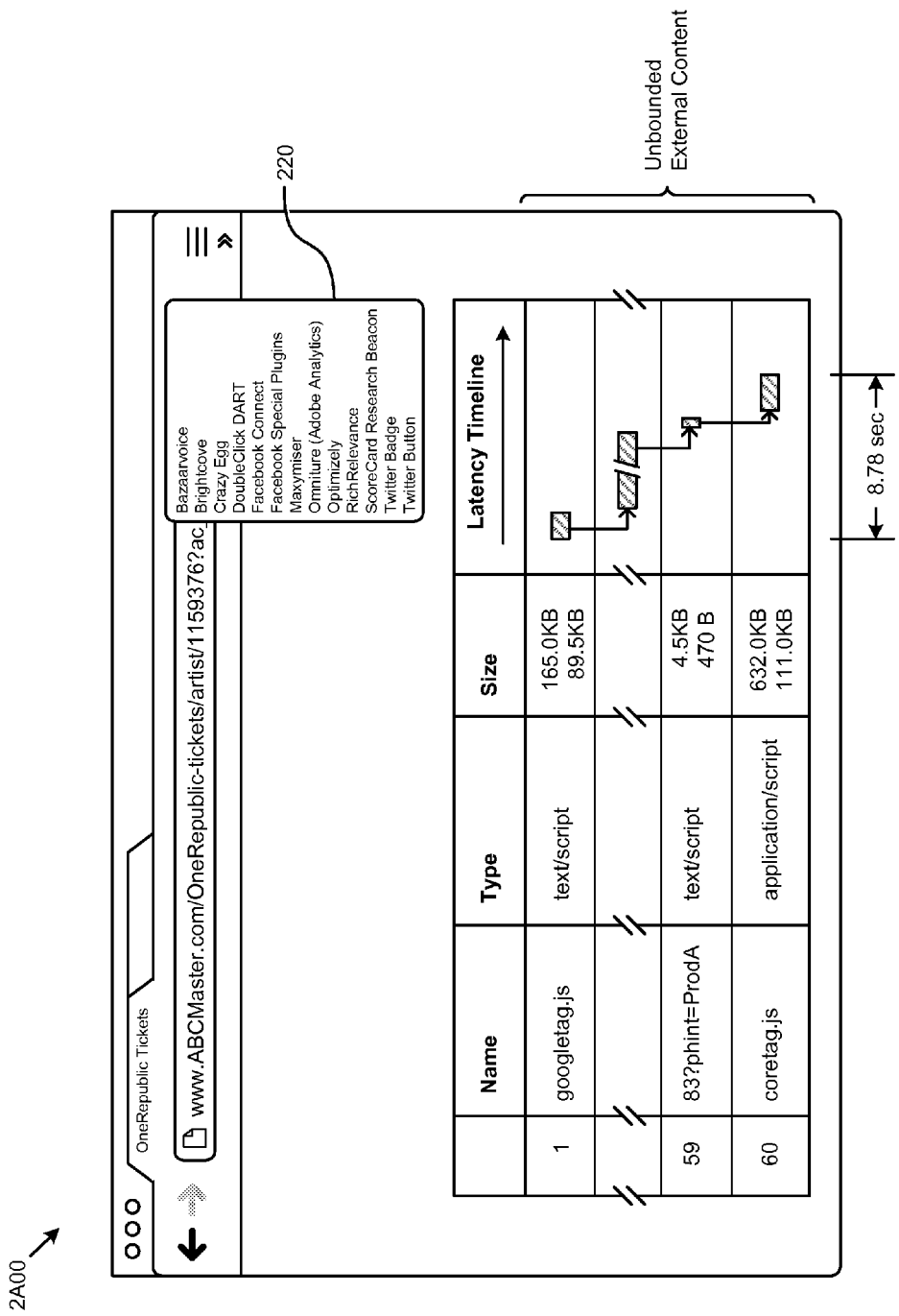
FIG. 2A illustrates a measurement interface showing unbounded web page element load latencies that exemplify the need for reducing web page load latency by scheduling sets of successive outgoing HTTP calls.

Some embodiments of the present disclosure address the problem of long latencies for initial web page rendering when issuing a large group of beacons and some embodiments are directed to approaches for scheduling smaller groups of successive outgoing HTTP calls. More particularly, disclosed herein and in the accompanying figures are exemplary environments, systems, methods, and computer program products for reducing web page load latency by scheduling sets of successive outgoing HTTP calls.

Overview

Web pages often include "dynamic portions of content" that are composed in response to browsing activities. For example, when a browsing user visits a web page of a content publisher or provider (e.g., HTTP://www.news.com), the content provider presents text and image constituents of the web page (e.g., headlines, lead articles, etc.), in juxtaposition with dynamically-determined portions of the web page (e.g., ads, beacons, hyperlinks, etc.). Processing resources demanded and processing time incurred for processing web page markup code for execution and display to a user's display terminal can be deterministic. For example, when a web page is comprised of purely text and image constituents of the web page, the time incurred for processing the web page markup can be predicted quite accurately. However, processing resources and time incurred can vary widely, for example, when a web page is comprised dynamic portions of content. When a web page is comprised of many dynamic portions of content, the likelihood of incurring rendering latency increases. In some cases incurring rendering latency detracts from a user's experience. More specifically, one or more dynamic portions of the web page may be based on the user's browsing activities, and performance of such browsing activities may incur latency. As examples, dynamic content can include scripts, HTTP GETs or HTTP PUTs, HTTP calls to href hyperlinks to retrieve additional content. In some cases dynamic content can retrieve external content in the form of scripts beacons, tags, hyperlinks, etc.), and in many cases dynamic content can include scripts retrieved from a server operated by a third party. Inclusion of dynamic content retrieved from a server operated by a third party can incur latency, especially if the server operated by a third party is a slow or overloaded server.

Many web pages include external content (e.g., delivered from a third party for inclusion in the web page for various purposes (e.g., invoking advertising, capturing data, providing analytics, etc.), yet legacy approaches are deficient at least in that the legacy approaches include all external content targeted for the web page in one batch. With this approach, performance (e.g., page load time) can be deleteriously impacted when the external content requested and/or retrieved is extensive, such as in the cases of issuing many beacons from multiple advertisers, or in cases when the external content retrieved is large.

In one embodiment, the present disclosure describes methods, systems, and computer program products that receive, at a server, a request for web page content to be included in a web page, the web page to be displayed by a browser at a user device. The web page might include dynamically generated content that may be determined by the server in response to or otherwise specific to the request or a certain type of request. For dynamically generated content, the web page content to be included is determined by the server, based at least in part on content driving information, which may include user demographics, and/or advertiser campaign specifications, and/or other information. In cases where the web page content is extensive (e.g., many advertisers have campaigns specifications that align to the user demographics associated with the web page content request), user-discernable latency (e.g., a few hundred milliseconds or more) in loading of the web page content at the browser might be detrimental to the user experience (e.g., long web page load latency or load times). As is further described below, web page content—even if extensive—can be partitioned into sets of web page content, and can be scheduled in accordance with certain constraints (e.g., number of calls to be scheduled, volume of content per page load, user time on page, etc.). In some cases the certain constraints can be provided by the website publisher. By constraining the content, the website publisher is able to manage the user experience (e.g., web page load times). In exemplary embodiments, portions of web page content are determined and/or managed according to scheduling scripts generated at the server for execution by the browser. For example, a second or Nth set of web page content can processed after a certain time delay (e.g., two seconds) if the user is still browsing that same web page. With this approach, many more advertisers are able to participate in the web page view or browsing session of the user without negatively impacting the user experience.

Various embodiments are described herein with reference to the figures. It should be noted that the figures are not necessarily drawn to scale and that the elements of similar structures or functions are sometimes represented by like reference numerals throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A1 and FIG. 1A2 present before-and-after comparison diagrams (e.g., diagram 1A100 and diagram 1A200) illustrating the effect of reducing web page load latency by scheduling sets of successive outgoing HTTP calls. As an option, one or more instances of diagram 1A100 and diagram 1A200 or any aspect thereof may be implemented in the context of the architecture and functionality of the embodiments described herein. Also, diagram 1A100 and diagram 1A200 or any aspect thereof may be implemented in any desired environment.

Diagram 1A100 depicts the interaction of a user with a web page over time. The web page can be presented or displayed to the user, and the user can browse the web page and initiate a request (e.g., server request) over an Internet connection. As an example, the request can provide information about the user and the user's browsing activity such that a set of external content (e.g., set of N beacons) is generated to be included in an updated version of the web page to be loaded. In legacy approaches, all of the external content (e.g., all N beacons) targeted for the web page in response to the request is included in the web page document and a loading event is initiated. As the page is loaded, each of the set of N beacons is rendered and an HTTP call to the respective beacon URL is issued. As the number N of the N beacons loaded and "fired" (e.g., HTTP call issued) increases, so does the page load latency and the time the user waits for the page to load and continue browsing (e.g., 10 seconds). Such long web page load latencies can detract from the user experience at the web page.

Diagram 1A200 illustrates the effect of reducing web page load latency by scheduling sets of successive outgoing HTTP calls. As an example, diagram 1A200 depicts an improvement in web page load latency (e.g., reduced user wait time) and user experience using the herein disclosed techniques. As shown in diagram 1A200, the web page can be presented or displayed to the user, and the user can browse the web page and initiate a request (e.g., server request) over an Internet connection. In such a setting, an Internet web page is parsed and rendered by a browser or browser-like function. HTML code referencing text and images comprising the web page are formatted to fit a display screen, and are rendered (e.g., displayed onto the display screen). Additionally, when the browser or browser-like function encounters HTML or other markup language code that codifies a request for dynamically generated content such as may be determined by the server in response to the request or otherwise specific to the request or a certain type of request, the browser waits for the response to the request before continuing to render the remainder of the web page. In many situations, the serial nature of a request/response protocol cannot be circumvented. More particularly, and as pertains to Internet advertising, A dynamic content request can be formatted to provide information about the user and the user's browsing activity. The recipient of the request can select content (e.g., set of N beacons, and/or a set of advertisements), and in turn generate a response to the requestor that comprises text and/or imagery, and/or markup code, and/or other code or scripts to be included for display or execution in an updated version of the web page. The herein disclosed techniques send a scheduling script and a subset (e.g., set 1 of M) of the external content targeted for the web page in response to the initial request. As the updated page is loaded, only a subset of the N beacons are rendered and fired, allowing the user to begin browsing after a short wait time (e.g., 3 seconds). Such rendering includes processing web page markup code for layout, processing markup code for execution, executing markup or script code, and delivering a composited set of text and images to a user's display terminal.

Referring to functions of the scheduling script, some such scheduling scripts are configured to invoke background request for one or more successive next sets of content (e.g., set 2, set 3, etc.) after a certain time interval (e.g., 2 seconds). The background request handler can self-introduce processing pauses, which in turn allows the next set of content to be delivered and executed without interrupting or otherwise detracting from the cadence of the browsing session of the user. The scheduling script continues to request further sets of the targeted external content until all content has been processed (e.g., M total sets), or until the user navigates to another web destination or otherwise cancels the then current processing. The number M of the M sets scheduled by the scheduling script can be based on various criteria (e.g., number of beacons per set, estimated load times per beacon, etc.).

FIG. 1B1 is an environment 1B100 illustrating the need for reducing web page load latency by scheduling sets of successive outgoing HTTP calls. As an option, one or more instances of environment 1B100 or any aspect thereof may be implemented in the context of the architecture and functionality of the embodiments described herein. Also, the environment 1B100 or any aspect thereof may be implemented in any desired environment.

As shown in FIG. 1B1, environment 1B100 comprises one or more instances of a web server 112, one or more instances of a data management server 111, one or more instances of an ad server 110, one or more instances of a management interface 109, and a variety of types and instances of user device 113 (e.g., a desktop 107, a laptop 102, an IP phone 103, a smart phone 104, and a tablet 105). The aforementioned servers and devices can communicate through a wireless network 106 and a network 108 (e.g., a wide area network (WAN), a local area network (LAN), etc.). Wireless network 106 and network 108 can sometimes be referred to as the Internet.

The shown protocol 120 depicts operations and communications on and among devices, including user device 113, web server 112, data management server 111, and ad server 110, and management interface 109. In this example, during the course of a browsing session, a user at user device 113 can generate events (e.g., clicking a link, entering a URL, etc.) to cause the user device 113 to request a web page from web server 112 (see message 121). Web server 112 will request content (e.g., code, scripts, beacons, etc.) from data management server 111 (e.g., beacon server, pixel server, etc.) to include in the web page to be provided to and rendered by user device 113 (see message 122). The data management server 111, possibly in combination with the ad server 110, will determine the content to be delivered to web server 112 (see operation 123). In exemplary cases, this determination is based in part from user demographics, advertiser business logic, and other information. In cases where the business logic of many advertisers align to the demographics and rules of the content request, data management server 111 might limit the number of content requests and/or limit the extent of delivered content (e.g., bounded content) according to various constraints (e.g., content per page load) as may be provided by the website publisher or provider (see operation 124). Any of a variety of rules and/or policies can be established (e.g., by a website publisher or owner of a web page). Rules and/or policies can include limits in the form of count limits and/or limits in the form of time limits. By enforcing rules and/or policies, the website publisher is able to manage the user experience (e.g., page load times).

Upon receipt of a request, the data management server 111 and/or the ad server 110 will then return the (possibly bounded) content to the web server 112 (see message 125), which will in turn compose the web page and deliver the web page to user device 113 (see message 126). User device 113 will then begin the page load for the newly composed web page including the new content (see operation 127). Browsing activity will be interrupted until the web page is completely loaded. As the page loads, the browser will load and execute the external content provided. Some content will initiate an HTTP call back to an advertiser (e.g., at ad server 110), alerting them of certain users and their activity. The advertiser can then process the calls and respond (e.g., place banner ad) as appropriate for its advertising strategy and rules (e.g., campaign). The synchronous process of loading external code and initiating HTTP calls to the advertiser (see operations 128) will repeat N times until all external code is loaded and executed and the page load completes (see operation 129) and a page load complete event message (e.g., "DOM ready" event message) is sent to the data management server 111 (see message 130). When the page load is completed, the user can resume browsing.

Since each iteration of this process (e.g., performing any of the operations 128) takes time to execute, latencies in the page load will be introduced. If code (e.g., beacons) for all advertisers interested in this particular user and browsing activity were included in the external code (e.g., N is large), the page load time would be relatively long (e.g., 10 seconds), and the user experience might be negatively impacted. To achieve a desired user experience, web publishers and content providers will limit (e.g., limit at N=4) the number of calls. This limit may prevent many advertisers (e.g., when N is large) from having the opportunity to engage with this user in this web page view or browsing session.

The herein disclosed techniques relate to one protocol that groups the entire set of content into smaller sets of a certain size (e.g., N=4) and issues the content in according to a time-based schedule. Another protocol involves grouping content into sets that can be predicted to consume a specified duration of time to execute (e.g., 500 milliseconds) and then issuing the content according to a time-based schedule, where each set does not consume more than the specified duration.

FIG. 1B2 is a protocol 1B200 used by systems for reducing web page load latency by scheduling sets of successive outgoing HTTP calls, according to some embodiments. As an option, one or more instances of protocol 1B200 or any aspect thereof may be implemented in the context of the architecture and functionality of the embodiments described herein. Also, the protocol 1B200 or any aspect thereof may be implemented in any desired environment.

As shown in FIG. 1B2, protocol 1B200 depicts operations and communications on and among user device 113, web server 112, data management server 111, ad server 110, and management interface 109 from environment 1B100 of FIG.

1B1. In this example, during the course of a browsing session, a user at user device 113 generates events (e.g., clicking a link, entering a URL, etc.) that cause user device 113 to request a web page from web server 112 (see message 141). Web server 112 will request content (e.g., code, scripts, beacons, etc.) from data management server 111 (e.g., beacon server, pixel server, etc.) to include in the web page to be provided to and rendered by user device 113 (see message 142). Data management server 111 will determine the content to deliver to web server 112 in part from user demographics, advertiser business logic, and other information (see operation 143).

In cases where the business logic of many advertisers align to the demographics and rules of the content request, data management server 111 will further schedule a sequence of sets (or portions) of content (e.g., content A, content B, content C) to be included in the web page according to various scheduling parameters (e.g., content per page load, content time on page) provided by the website publisher (e.g., see operation 144). By constraining the content from data management server 111, the website publisher is able to manage the user experience (e.g., page load times). Data management server 111 will then return a first set of content (e.g., content A) to the web server 112 (see message 145), which will in turn return the newly composed web page including the first set of content to user device 113 (see message 146). As an example, in one or more embodiments, content A can comprise a scheduling script and a certain number (e.g., N=4) of beacons (e.g., beacon1 through beacon4).

User device 113 will then begin the initial page load for the newly composed web page including content A (see operation 147). As the page loads, the browser will load and execute content A provided. Some of content A will initiate an HTTP call back to an advertiser (e.g., at ad server 110), alerting them of certain users and their activity. The advertiser can then process the calls and respond (e.g., place banner ad) as appropriate for its advertising strategy and rules (e.g., campaign). The process of loading external code from content A and initiating HTTP calls to advertisers (see operations 148) will repeat N times until all of content A is loaded and executed and the page load completes (see operation 149). When the page load is completed, the user can resume browsing.

After a predetermined time on page or time interval (e.g., 2 seconds after "DOM ready" or 2 seconds after the page load completes), the scheduling script will direct user device 113 to request additional content from the scheduled sets of content at data management server 111. This request to data management server 111 is configured to indicate that this is a "post-load" call, and would only return the next set of scheduled content (e.g., content B) back to the web page at user device 113. As an example, in one or more embodiments, content B can comprise a second set of beacons (e.g., beacon5 through beacon8). As content B is loaded in the web page, some of content B will initiate an HTTP call back to an advertiser (e.g., at ad server 110), alerting them of certain users and their activity. The HTTP calls to advertisers (see operations $150_1$) will repeat N times until all of content B is loaded and executed. After another predetermined time on page or time interval (e.g., 2 seconds after "DOM ready" or 2 seconds after the page load completes), the scheduling script will direct user device 113 to request additional content from the scheduled sets of content at data management server 111. This request to data management server 111 is configured to indicate that this is a "post-load" call, and would only return the next set of scheduled content (e.g., content C) back to the web page at user device 113. As an example, in one or more embodiments, content C can comprise a third set of beacons (e.g., beacon9 through beacon12). As content C is loaded in the web page, some of content C will initiate an HTTP call back to an advertiser (e.g., at ad server 110), alerting them of certain users and their activity. The HTTP calls to advertisers (see operations 1502) will repeat N times until all of content C is loaded and executed.

With the approach shown in protocol 1B200, many more advertisers are able to participate in the web page view or browsing session of the user without impacting the user experience (e.g., page load times or latencies). This is achieved, in part, by the scheduling of sets of external content (e.g., code, beacons, calls, etc.) to be delivered "post-load" to the web page at predetermined time intervals. In particular, adding the new time dimension (e.g., "time on page") to the content display constraints, the external code (e.g., scheduling script) can be configured to not only respect the website operator's or publisher's limits on initial page load time, but also to pull more HTTP calls to the web page if the user remains on the page beyond a predetermined time. In this example, three sets of scheduled content are shown in protocol 1B200, but other numbers and sizes of content sets can be included in other examples and embodiments.

FIG. 2A illustrates a measurement interface 2A00 showing unbounded web page element load latencies that exemplify the need for reducing web page load latency by scheduling sets of successive outgoing HTTP calls. As an option, one or more instances of measurement interface 2A00 or any aspect thereof may be implemented in the context of the architecture and functionality of the embodiments described herein. Also, the measurement interface 2A00 or any aspect thereof may be implemented in any desired environment.

The information displayed in the measurement interface 2A00 exemplifies the need for reducing web page load latency by scheduling sets of successive outgoing HTTP calls. Measurement interface 2A00 shows an excerpt of the various HTML code elements (e.g., comprising, in part, external content from a source such as data management server 111) that are loaded and executed during the page load of the web page shown. Specifically, the measurement interface 2A00 shows the name, type, size (e.g., of data transferred), and latency (e.g., from code invocation to completion) of each excerpted element. For example, the HTML code elements can represent external content (e.g., beacons, tags, pixel tags, scripts, page hints ("phints"), calls, messages, etc.) from multiple advertisers configured to execute on page load and/or on certain events (e.g., DOM events) such that the respective advertiser can monitor user behavior at the web page, deliver additional content (e.g., banner ad) to the web page, and other operations.

More specifically, measurement interface 2A00 reveals that when the scope of a set of external content is unbounded and all targeted content is included in the web page, the web page load processes a total of 60 elements and exhibits a total load time of 8.78 seconds. A web page load time of 8.78 seconds may be deemed unacceptable by many website providers or publishers as detrimental to the user experience. However, as highlighted in pop-up window 220, a relatively large number of third parties (e.g., advertisers) have established campaign rules that have determined an interest in participating (e.g., including their content) in this particular user web page view. In the case shown in FIG. 2A, all the advertisers interested in participating in the web page view are included, but the web page load time might be detrimental to the user experience.

Figure 2B:
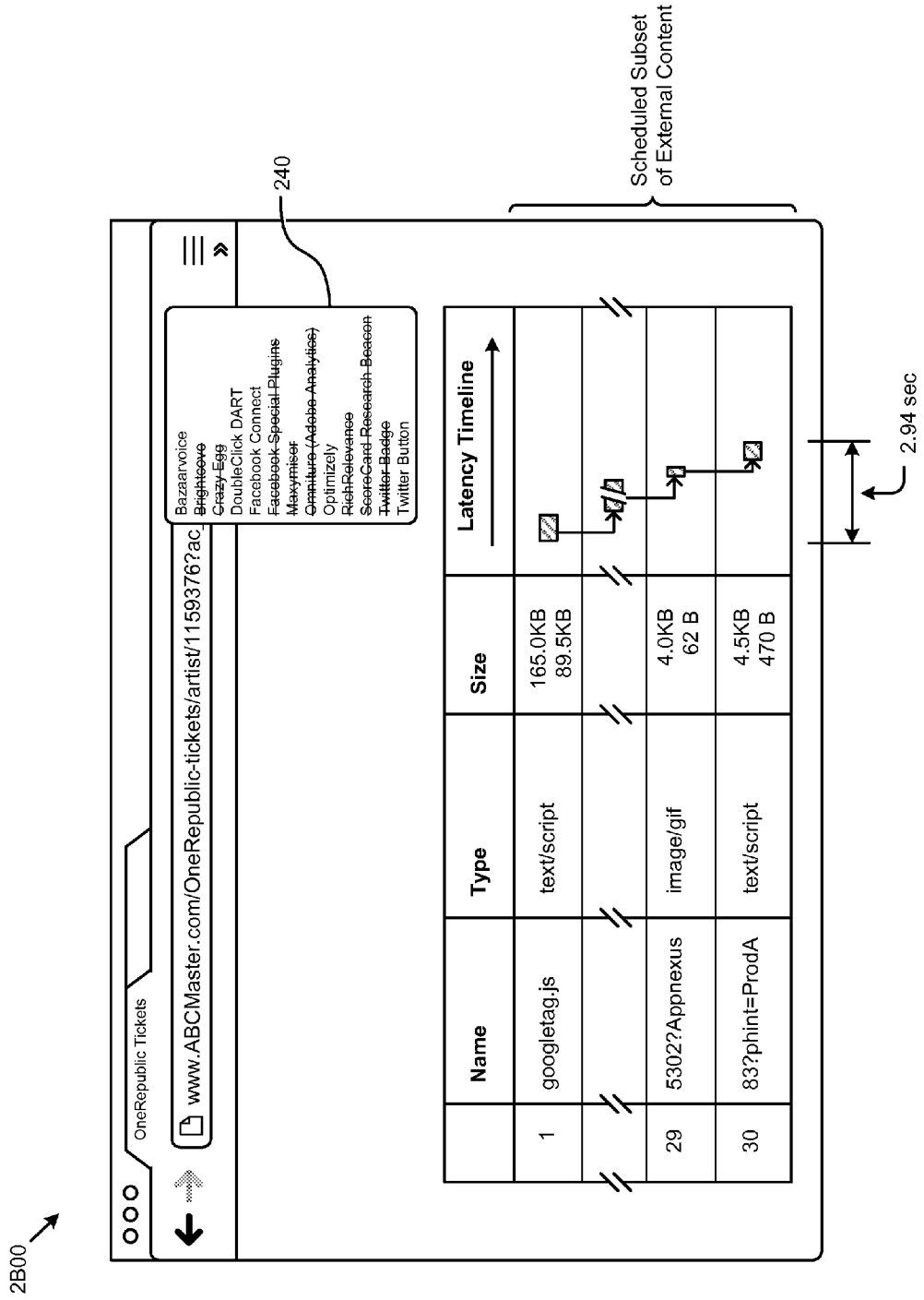
FIG. 2B illustrates a measurement interface showing bounded web page element load latencies that serve for reducing web page load latency by scheduling sets of successive outgoing HTTP calls.

FIG. 2B illustrates a measurement interface 2B00 showing bounded web page element load latencies that serve for reducing web page load latency by scheduling sets of successive outgoing HTTP calls. As an option, one or more instances of measurement interface 2B00 or any aspect thereof may be implemented in the context of the architecture and functionality of the embodiments described herein. Also, measurement interface 2B00 or any aspect thereof may be implemented in any desired environment.

The information displayed in the measurement interface 2B00 exemplifies the effect of reducing web page load latency by scheduling sets of successive outgoing HTTP calls. Measurement interface 2B00 shows an excerpt of the various elements (e.g., comprising, in part, external content from a source such as data management server 111) that are loaded and executed during the page load of the web page shown. Specifically, the measurement interface 2B00 shows the name, type, size (e.g., incoming and outgoing), latency, and other attributes (e.g., path, content, etc.) of each excerpted element. The web page load processes a total of 30 elements and exhibits a total load time of 2.94 seconds. A web page load time of 2.94 seconds may be deemed acceptable by many website providers or publishers with regard to the user experience. However, as highlighted in pop-up window 240, limiting to just these 30 elements, a relatively large number of interested third parties (e.g., advertisers) are not able to participate in this particular user web page view. In the case shown in FIG. 2B, the web page load time may be acceptable with regard to the user experience, but given the limit of 30 elements, not all the advertisers interested in participating in the web page view are included.

The herein disclosed techniques can be used to both manage the user experience (e.g., web page load latency) and accommodate all of the third parties interested in participating in the web page view by reducing web page load latency by scheduling sets of successive outgoing HTTP calls (e.g., beacons and other content elements).

FIG. 2C shows example content 2C00 as used in systems for reducing web page load latency by scheduling sets of successive outgoing HTTP calls. As an option, one or more instances of example content 2C00 or any aspect thereof may be implemented in the context of the architecture and functionality of the embodiments described herein. Also, the example content 2C00 or any aspect thereof may be implemented in any desired environment.

Example content 2C00 of FIG. 2C shows a representative example of an HTML code element that can be included in a set of external content targeted for a given web page. Specifically, example content 2C00 illustrates a code element that includes structured (e.g., HTML) information comprising, in part, 1×1 pixel images or beacons (or pixel tags, page tags, web bugs, tracking bugs, tracking pixel, 1×1 gif, clear gif, etc.). More specifically, example content 2C00 comprises a set of 60 beacons associated with a respective set of 60 advertisers (e.g., company1, company2, . . . , company60) and can be representative of a full set of content 250. As an example, the beacons will issue an HTTP call to the URL of the respective beacon when the web page including the beacons is loaded. The ad servers at the URLs of each beacon will use the beacons to monitor user behavior at the web page, deliver additional content (e.g., banner ad) to the web page, and other operations. Example content 2C00 can be used to illustrate the herein disclosed techniques for reducing web page load latency by scheduling sets of successive outgoing HTTP calls as discussed in FIGS. 3A and 3B.

FIG. 3A and FIG. 3B present flow diagrams (e.g., flow diagram 3A00 and flow diagram 3B00, respectively) illustrating the scheduling of sets of content comprising a full set of content as used in systems for reducing web page load latency by scheduling sets of successive outgoing HTTP calls. As an option, one or more instances of flow diagram 3A00 and flow diagram 3B00 or any aspect thereof may be implemented in the context of the architecture and functionality of the embodiments described herein. Also, flow diagram 3A00 and flow diagram 3B00 or any aspect thereof may be implemented in any desired environment.

As shown in FIG. 3A, flow diagram 3A00 illustrates a technique for including external content in a web page that serves to load the full set of content 250 in a single web page load. As an example, and in reference to FIG. 2C, the full set of content 250 comprises HTML code associated with 60 beacons. Flow diagram 3A00 begins with a content request $302_1$ (e.g., invoked by browsing activity of a user at a web page) that is used to generate a set of external content (e.g., the full set of content 250) to be included in the web page. In the example shown in flow diagram 3A00, the full set of content 250 is included in its entirety (e.g., all 60 beacons) in a page load $304_1$. The user will then wait for the web page to load and execute the full set of content 250 before being able to resume browsing $306_1$ (e.g., web page load latency of 10 seconds).

In comparison to flow diagram 3A00, flow diagram 3B00 illustrates an example and embodiment of the herein disclosed techniques for reducing web page load latency by scheduling sets of successive outgoing HTTP calls. Specifically, flow diagram 3B00 illustrates the herein disclosed technique for partitioning the full set of content 250 into two or more sets and scheduling the loading and execution of such sets to reduce web page load latency and improve the user experience. As an example, the full set of content 250 (e.g., 60 beacons) can be partitioned into a set A of content 352, a set B of content 354, and a set C of content 356, having 30 beacons, 20 beacons, and 10 beacons, respectively. Flow diagram 3B00 begins with a content request $302_2$ (e.g., invoked by browsing activity of a user at a web page) that is used to generate a set of external content (e.g., the full set of content 250) to be included in the web page. In the example shown in flow diagram 3B00, the set A of content 352 (e.g., and a scheduling script) is included in a page load $304_2$. When page load $304_2$ completes, the user can resume browsing $306_2$. The remaining sets of content (e.g., set B of content 354 and set C of content 356) are loaded in the background in response to post-load requests (e.g., see post-load $308_1$ and post-load $308_2$) without interrupting the browsing activity of the user. Since page load $304_2$ includes a smaller set of content (e.g., 30 beacons) as compared to page load $304_1$ in flow diagram 3A00, the latency of page load $304_2$ (e.g., 3 seconds) is shorter than the page latency of page load $304_1$ (e.g., 10 seconds), positively impacting the user experience.

Figure 5:
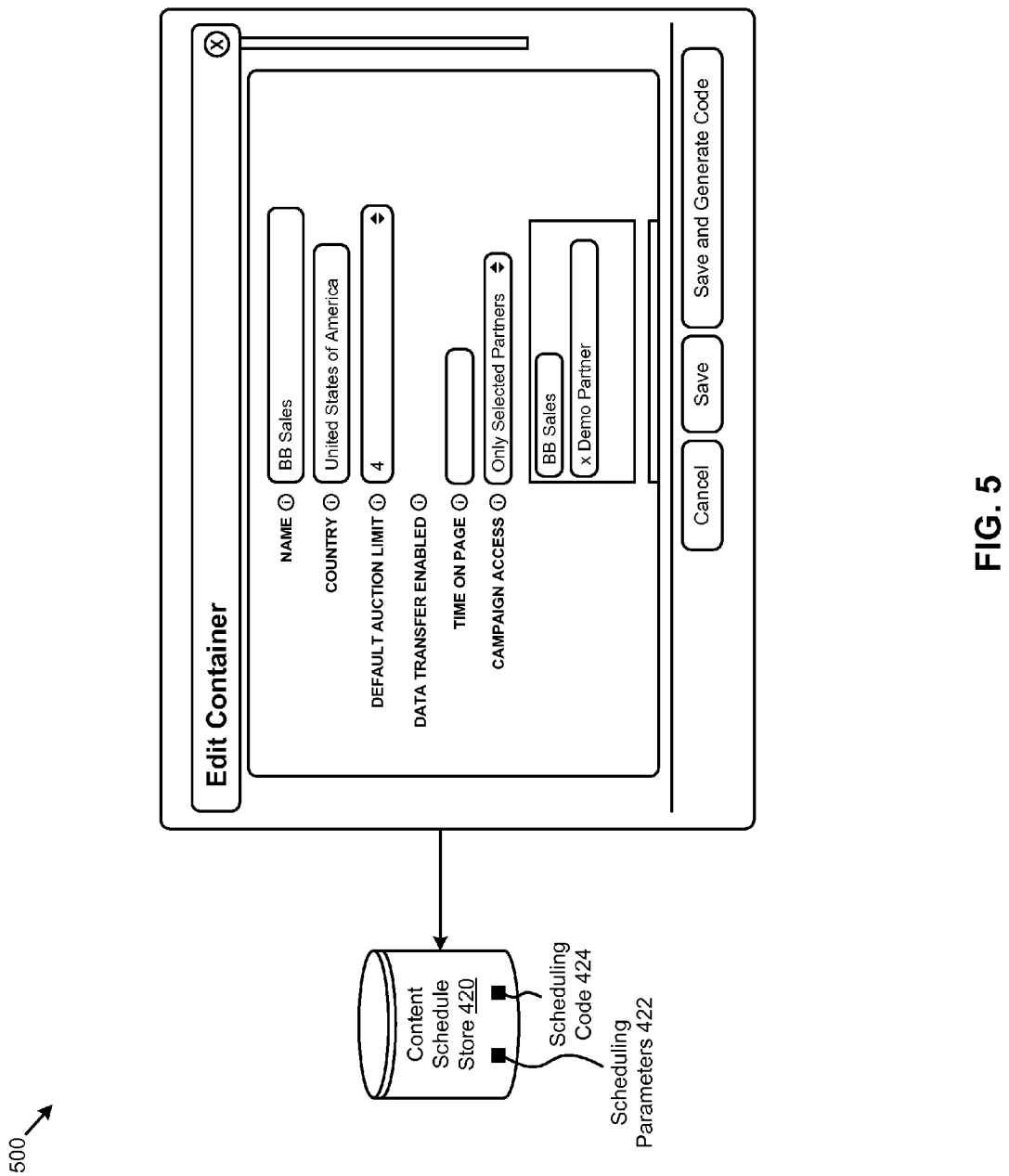
FIG. 5 presents a management user interface to manage parameters used in systems for reducing web page load latency by scheduling sets of successive outgoing HTTP calls, according to one embodiment.

The content and partitioning shown in flow diagram 3B00 is just one example. Other possible combinations of sets of content, scheduling criteria (e.g., size of partitions or subsets, timing of post-loads, etc.), and additional attributes can be used in implementing techniques and systems for reducing web page load latency by scheduling sets of successive outgoing HTTP calls. FIG. 4 and FIG. 5 describe techniques for establishing such combinations.

FIG. 4 presents a protocol 400 for establishing and observing content scheduling parameters as used in systems for reducing web page load latency by scheduling sets of successive outgoing HTTP calls. As an option, one or more instances of protocol 400 or any aspect thereof may be implemented in the context of the architecture and functionality of the embodiments described herein. Also, the protocol 400 or any aspect thereof may be implemented in any desired environment.

The protocol 400 of FIG. 4 depicts operations and communications on and among data management server 111, ad server 110, and management interface 109 (see environment 1B100 of FIG. 1B1). FIG. 4 further comprises a content schedule store 420. In this example, a manager (e.g., website publisher or provider, administrator, etc.) will invoke a content scheduling editor (see operation 402) to manage scheduling attributes for content delivered by data management server 111 to a web server for display on a user device. Using the content scheduling editor, the manager can specify a set of scheduling parameters 422 (e.g., content items, auction limit per page load, content time on page, selected advertiser partners, etc.) for a given campaign or set of content (see operation 404). The manager can then save scheduling parameters (see operation 406) and invoke the logic to generate code 408 such as the aforementioned set of scheduling code 424 (e.g., one or more scheduling scripts) based, in part, on the scheduling parameters 422 and other rules established for the campaign or set of content. The scheduling parameters 422 and scheduling code 424 are also updated on data management server 111 and in the content schedule store 420, such that the scheduling code 424 can be deployed in response to future requests (e.g., see message 145 in protocol 1B200).

FIG. 5 presents a management user interface 500 to manage parameters used in systems for reducing web page load latency by scheduling sets of successive outgoing HTTP calls. As an option, one or more instances of management user interface 500 or any aspect thereof may be implemented in the context of the architecture and functionality of the embodiments described herein. Also, the management user interface 500 or any aspect thereof may be implemented in any desired environment.

As shown in FIG. 5, management user interface 500 is a graphical user interface that can enable such activity as that depicted and describe in protocol 400. Specifically, management user interface 500 provides input mechanisms for parameters "DEFAULT AUCTION LIMIT" (DAL), "TIME ON PAGE" (TOP), and "CAMPAIGN ACCESS" (CA). In one or more embodiments, DAL can represent the maximum number of buyer beacons (e.g., advertiser content or HTTP calls) that can be fired (e.g., included or loaded) per web page. For example, the DAL parameter can define the size of each set of content in protocol 1B200 and flow diagram 3B00. TOP can represent the time a given set of content will remain on the web page before being replaced by the next set of scheduled content. In some embodiments, TOP can further determine a time interval between requests for sets of scheduled content. CA can provide an additional content scheduling constraint related to the specific advertising partners to be included in a particular campaign. Other scheduling attributes and parameters can also be established at management user interface 500. The management user interface 500 also provides buttons to cancel changes, save changes, and save changes and generate code for the scheduling (e.g., a scheduling script). The set of scheduling parameters 422 and scheduling code 424 specified, generated, and saved at management user interface 500 can be stored in a content schedule store 420.

Figure 6A:
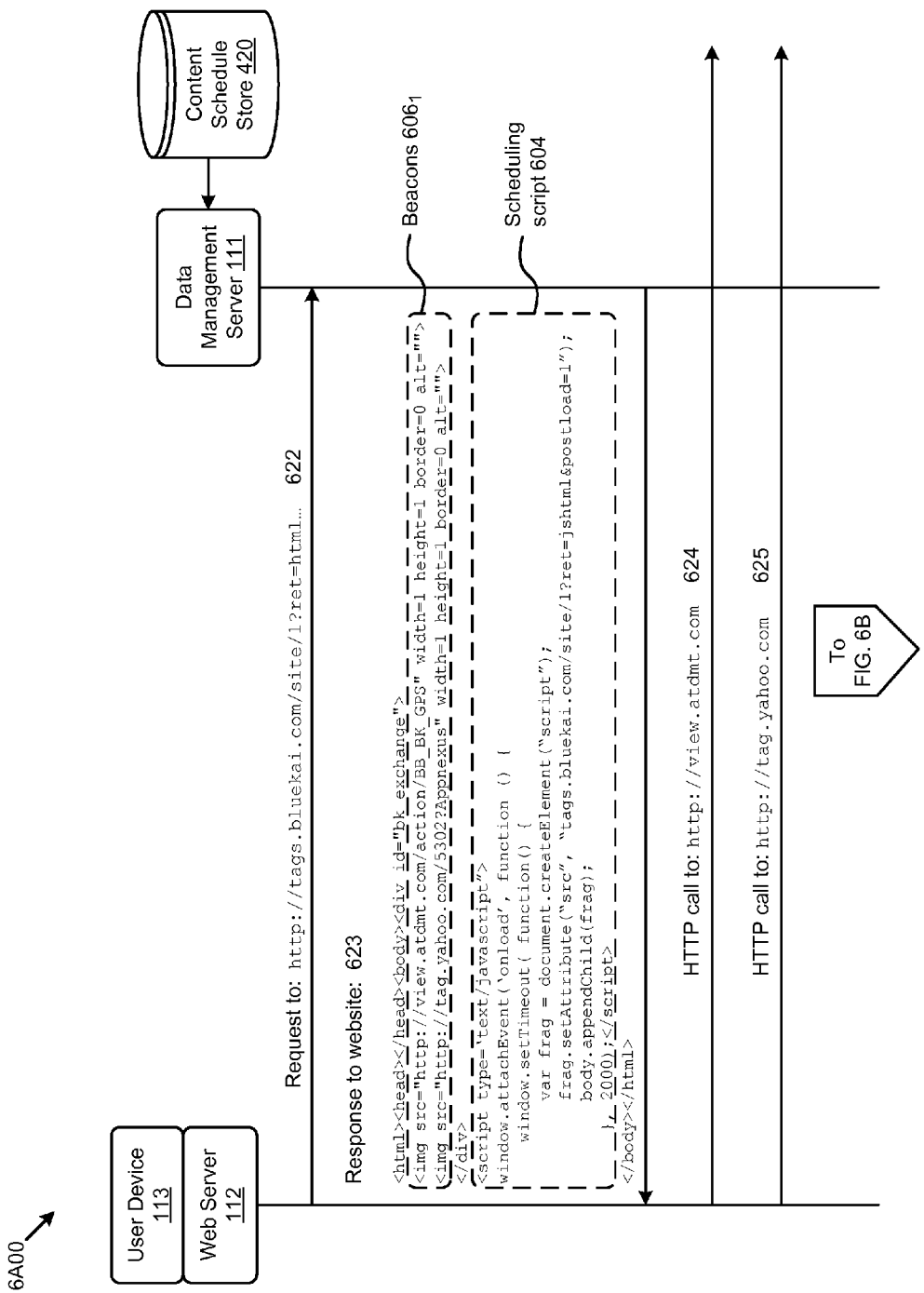
FIG. 6A, FIG. 6B, and FIG. 6C present diagrams depicting an approach used to implement a technique for reducing web page load latency by scheduling sets of successive outgoing HTTP calls, according to an embodiment.
Figure 6B:
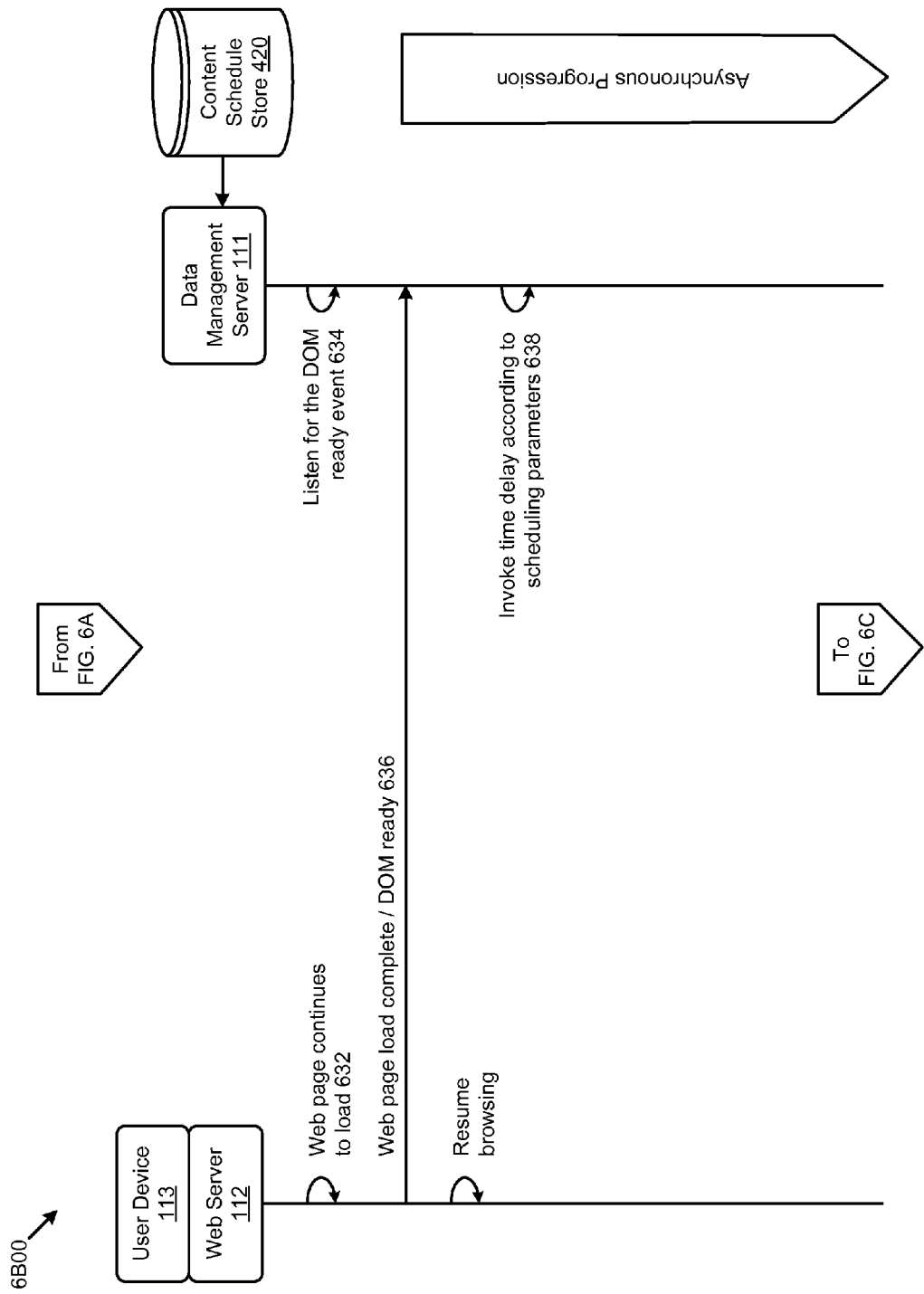
Figure 6C:
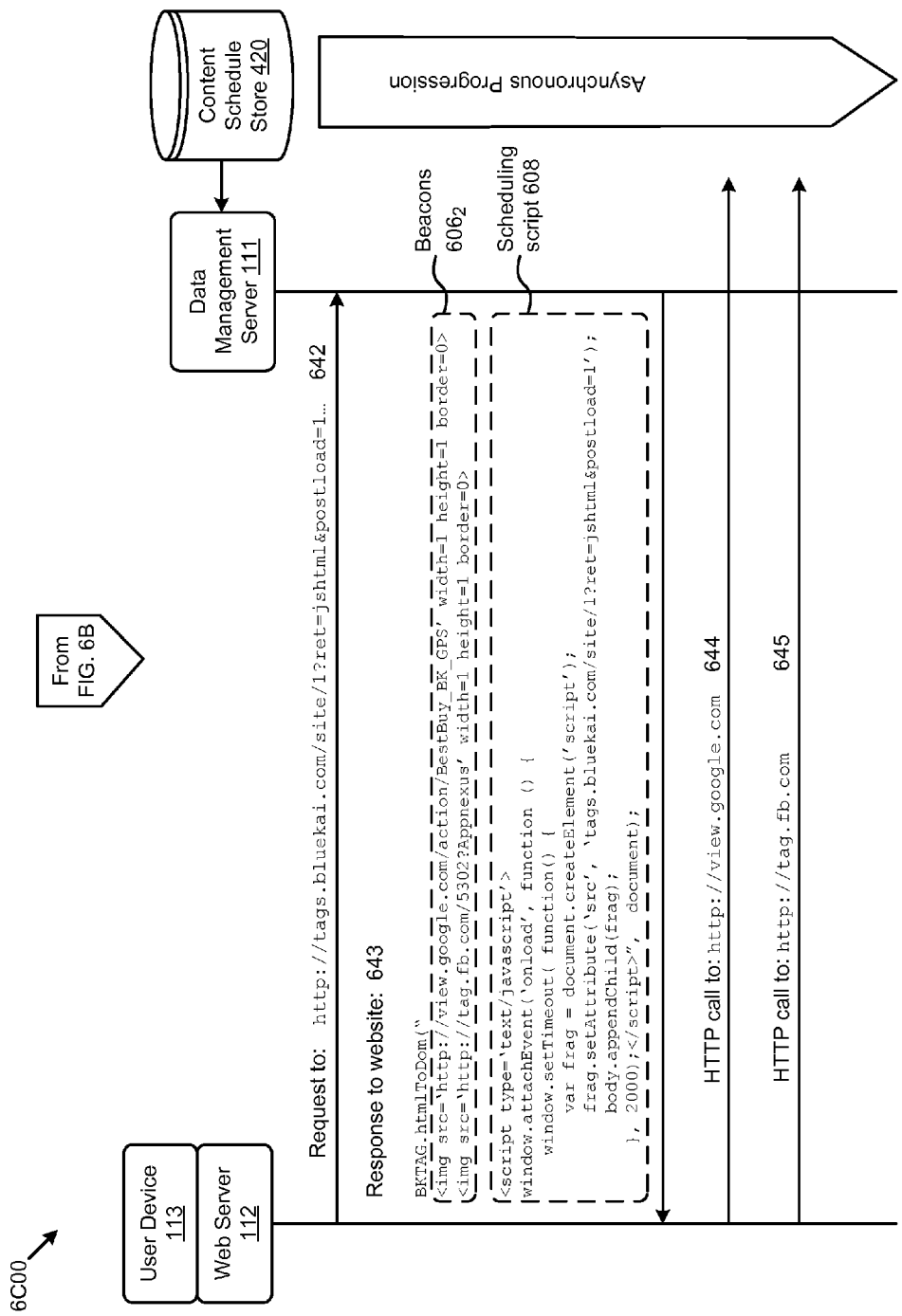

FIG. 6A, FIG. 6B, and FIG. 6C present diagrams (e.g., diagram 6A00, diagram 6B00, and diagram 6C00, respectively) depicting an approach used to implement a technique for reducing web page load latency by scheduling sets of successive outgoing HTTP calls. As an option, one or more aspects of the approaches may be implemented in the context of the architecture and functionality of the embodiments described herein. Also, the approach or any aspect thereof may be implemented in any desired environment.

Diagram 6A00, diagram 6B00, and diagram 6C00, respectively, depict sample code related to the operations and communications of protocol 1B200. For simplicity and readability of FIG. 6A, FIG. 6B, and FIG. 6C, user device 113 and web server 112 are combined, and ad server 110 and management interface 109 are not shown. FIG. 6A, FIG. 6B, and FIG. 6C, further show a content schedule store 420 coupled to data management server 111. Specifically, diagram 6A00 shows a request to data management server 111 at http://tags.bluekai.com (see message 622). Data management server 111 responds with content (see response to website message 623) that includes, in part, a first set of beacons $606_1$. In this example, the parameters and rules stored in content schedule store 420 further indicate that this request should schedule multiple sets of content (e.g., postload=1), and data management server 111 includes a scheduling script 604 in the response. If the parameters and rules stored in content schedule store 420 indicate that this request does not require multiple sets of content (e.g., postload=1), then the additional script content is not appended to the response. As the page and code are loaded at web server 112 and user device 113, the two beacons included in the code are fired and HTTP calls are made to the corresponding tag owner at http://view.atdmt.com and http://tag.yahoo.com (see message 624 and message 625, respectively).

Continuing FIG. 6B, the web page continues to load at web server 112 and user device 113 (see operation 632), while data management server 111 listens for completion of the page load (e.g., DOM ready event) as specified in the scheduling script 604 (see operation 634). After DOM ready is received (see message 636), a time interval (e.g., 2 seconds) will be invoked according to the function parameters included in the scheduling script 604 (see operation 638). Other triggering events and time intervals can be used in other examples and embodiments. Once the web page loads and the user can resume browsing, further operations and communications can occur in the background and/or in an asynchronous progression so as to avoid waiting or latency impact to the user experience.

Continuing to FIG. 6C, if the user is still on the page at web server 112 and user device 113 when the time interval (e.g., 2 seconds) is completed, the scheduling script 604 invokes another request to data management server 111 for additional content (see message 642). This subsequent request shown in diagram 6C00 specifies different return parameters (e.g., "ret=jshtml" and "postload=1") than the return parameter (e.g., "ret=html") specified in the original request shown in diagram 6A00 (see message 622). The "postload=1" parameter directs the data management server to respond to this request in a special manner (e.g., select the next set of scheduled content), and the "ret=jshtml" directs the data management server to return the contents embedded in a scheduling function (e.g., BKTAG.htmlToDom) to be attached to the web page (see message 643). In this embodiment, the processing (e.g., processing of BKTAG.htmlToDom) not only attaches a second set of beacons 606 (e.g., beacons 606$_2$) to the web page, but also includes another scheduling script 608 to initiate a subsequent call after another time interval (e.g., 2 seconds). The processing attaches new beacons (e.g., beacons 606$_2$). When these beacons are fired, HTTP calls are made to the two additional corresponding tag owners at http://view.google.com and http://tag.fb.com (see message 644 and message 645, respectively). The process illustrated in diagram 6C00 can be repeated to include more beacons or other content in the web page as necessary.

Figure 7:
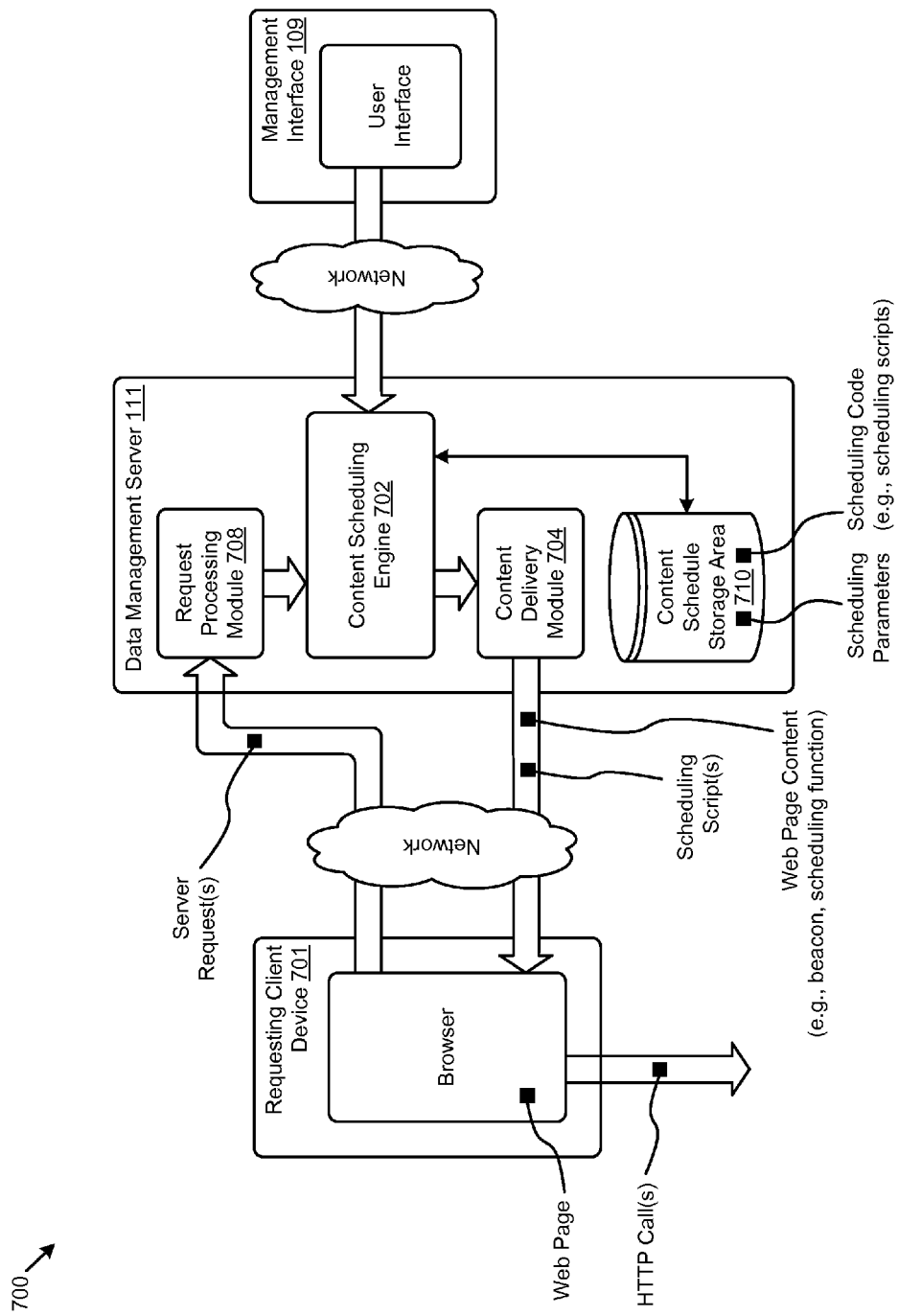
FIG. 7 presents a block diagram of a system for reducing web page load latency by scheduling sets of successive outgoing HTTP calls, according to an embodiment.

FIG. 7 presents a block diagram of a system 700 for reducing web page load latency by scheduling sets of successive outgoing HTTP calls. As an option, one or more instances of system 700 or any aspect thereof may be implemented in the context of the architecture and functionality of the embodiments described herein. Also, the system 700 or any aspect thereof may be implemented in any desired environment. System 700 is an arrangement of computing modules that are interconnected so as to operate cooperatively to implement any of the herein-disclosed embodiments. The partitioning of system 700 is merely illustrative and other partitions are possible.

As shown in FIG. 7, further embodiments can include the system 700 configured to receive (e.g., by a request processing module 708) a first server request over a network responsive to an operation executed by a browser (e.g., by a browser within a requesting client device 701). The system 700 is further configured to be responsive to the first server request, and invoke logic (e.g., by a content scheduling engine 702) to generate a first scheduling script and select two or more sets of web page content, the first scheduling script to be executed by the browser. As shown, the content scheduling engine cooperates with the content delivery module 704 to generate a scheduling script and to format and send the scheduling script to be executed by the requestor. In the shown embodiment, the scheduling script is generated in response to the determination engine, which in turn performs steps to determine if and when two or more portions of dynamic content are to be processed separately. A data structure (e.g., a content schedule storage area 710) can comprise rules, policies, scheduling parameters and scheduling code, any of which can be accessed by any function or functions of the data management server.

The system 700 is also configured to send (e.g., by a content delivery module) at least a portion of the two or more sets of web page content over the network responsive to the execution of the first scheduling script by the browser. In one or more embodiments, the execution of the first scheduling script invokes a second server request. In one or more embodiments, the sending of a first one of the sets of web page content and the sending of a second one of the sets of web page content are related by at least one of a time interval and a DOM event. In one or more embodiments, at least one of the sets of web page content comprises at least one beacon that invokes an HTTP call when loaded by the browser. In one or more embodiments, at least one of the sets of web page content comprises a scheduling function to be executed by the browser, wherein the scheduling function comprises at least one of a second scheduling script and a beacon. In one or more embodiments, the sending of at least one of the sets of web page content is invoked by at least one DOM event. In one or more embodiments, at least a portion of the two or more sets of web page content are included in a web page before causing re-rendering of the web page by the browser. In one or more embodiments, at least one of the first scheduling script and the sets of web page content are based, in part, on a set of scheduling parameters. Further, the set of scheduling parameters can comprise at least one of an auction limit per page load, a content time on page, a list of selected advertiser partners, and a web page load time. Also, the set of scheduling parameters can be selected at a management user interface.

Additional Embodiments of the Disclosure

Additional Practical Application Examples

Figure 8A:
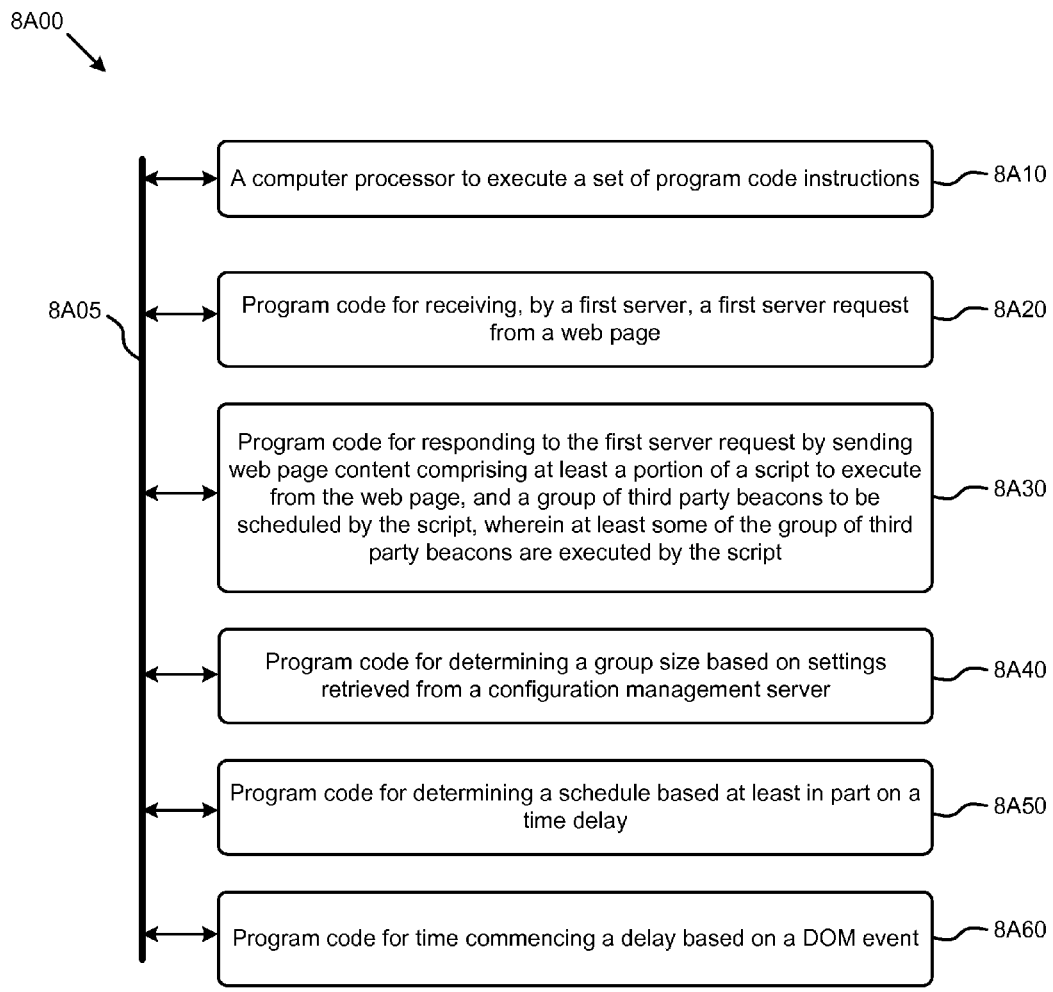
FIG. 8A, FIG. 8B and FIG. 8C depict systems as an arrangement of computing modules that are interconnected so as to operate cooperatively to implement any of the herein-disclosed embodiments.

FIG. 8A depicts a system 8A00 as an arrangement of computing modules that are interconnected so as to operate cooperatively to implement any of the herein-disclosed embodiments. The partitioning of system 8A00 is merely illustrative and other partitions are possible. The system 8A00 or any operation therein may be carried out in any desired environment. As shown, system 8A00 comprises at least one processor and at least one memory, the memory serving to store program instructions corresponding to the operations of the system 8A00. As shown, an operation can be implemented in whole or in part using program instructions accessible by a module. The modules are connected to a communication path 8A05, and any operation can communicate with other operations over communication path 8A05. The modules of the system 8A00 can, individually or in combination, perform method operations within system 8A00. Any operations performed within system 8A00 may be performed in any order unless as may be specified in the claims.

Specifically, the embodiment of FIG. 8A implements a portion of a computer system, shown as system 8A00, comprising a computer processor to execute a set of program code instructions (see module 8A10) and modules for accessing memory to hold program code instructions to perform: receiving, by a first server, a first server request from a web page (see module 8A20); responding to the first server request by sending web page content comprising at least a portion of a script to execute from the web page, and a group of third party beacons to be scheduled by the script, wherein at least some of the group of third party beacons are executed by the script (see module 8A30); determining a group size based on settings retrieved from a configuration management server (see module 8A40); determining a schedule based at least in part on a time delay (see module 8A50); and commencing a delay based on a DOM event (see module 8A60).

Figure 8B:
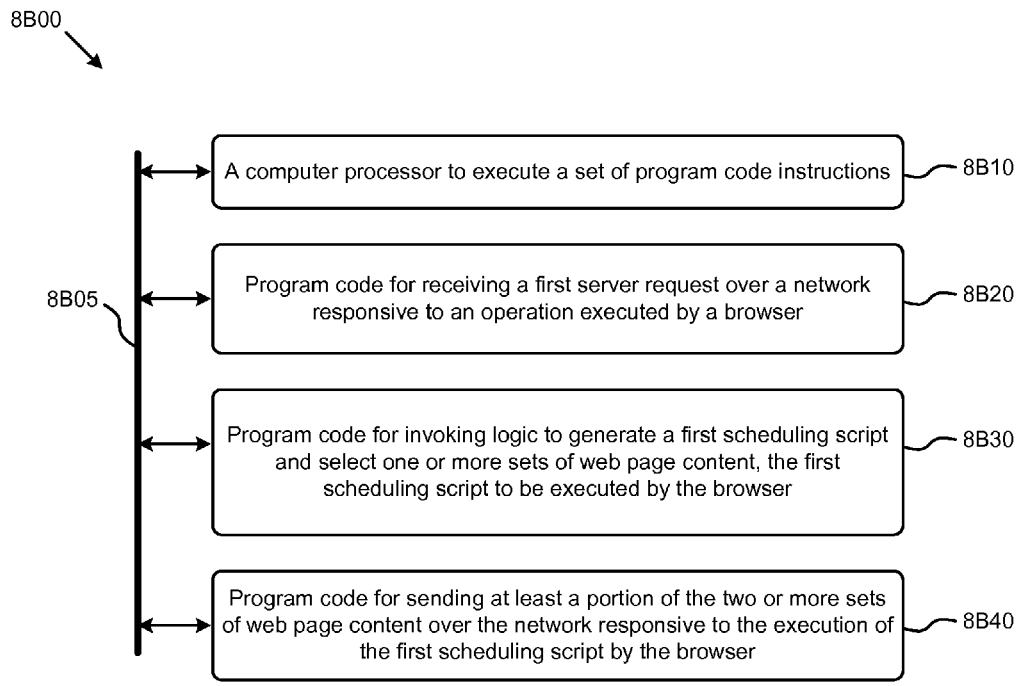

FIG. 8B depicts a system 8B00 as an arrangement of computing modules that are interconnected so as to operate cooperatively to implement any of the herein-disclosed embodiments. The partitioning of system 8B00 is merely illustrative and other partitions are possible. The system 8B00 or any operation therein may be carried out in any desired environment. As shown, system 8B00 comprises at least one processor and at least one memory, the memory serving to store program instructions corresponding to the operations of the system 8B00. As shown, an operation can be implemented in whole or in part using program instructions accessible by a module. The modules are connected to a communication path 8B05, and any operation can communicate with other operations over communication path 8B05. The modules of the system 8B00 can, individually or in combination, perform method operations within system 8B00. Any operations performed within system 8B00 may be performed in any order unless as may be specified in the claims.

Specifically, the embodiment of FIG. 8B implements a portion of a computer system, shown as system 8B00, comprising a computer processor to execute a set of program code instructions (see module 8B10) and modules for accessing memory to hold program code instructions to perform: receiving a first server request over a network responsive to an operation executed by a browser (see module 8B20); responsive to the first server request, invoking logic to generate a first scheduling script and select two or more sets of web page content, the first scheduling script to be executed by the browser (see module 8B30); and sending at least a portion of the two or more sets of web page content over the network responsive to the execution of the first scheduling script by the browser (see module 8B40).

Figure 8C:
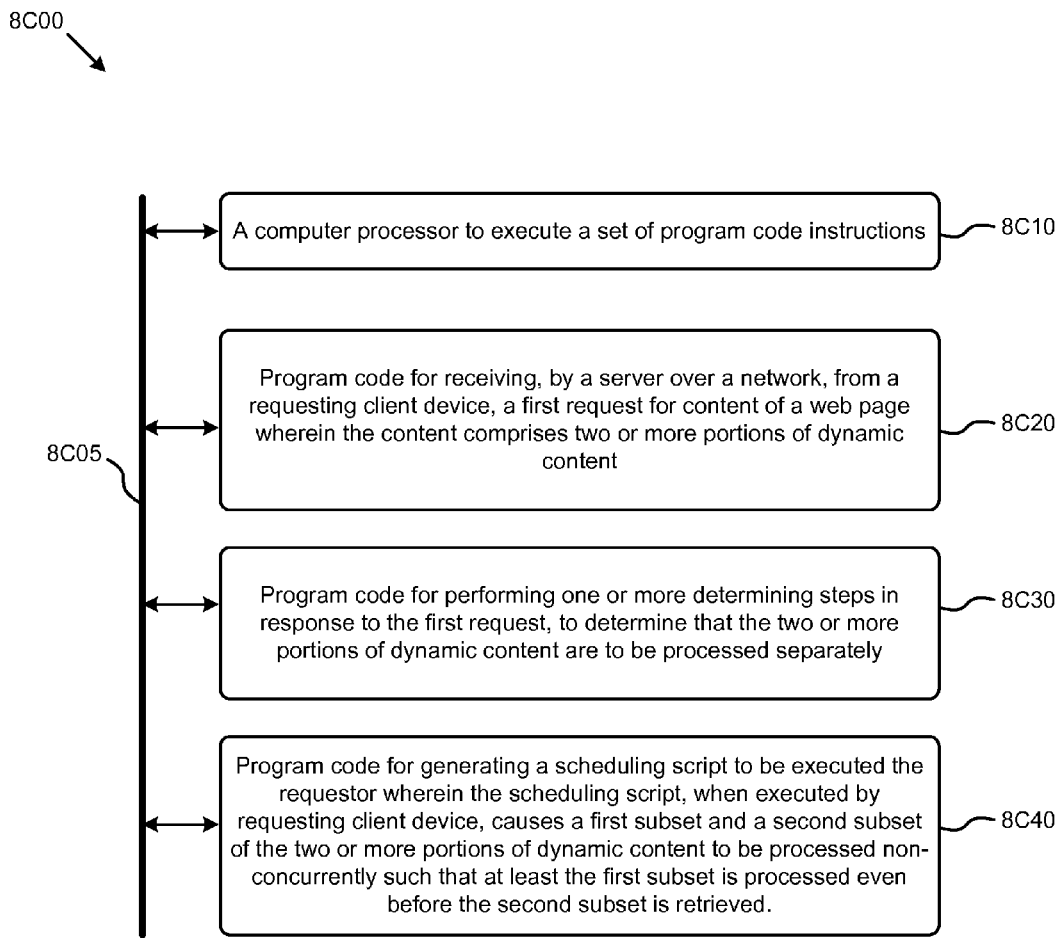

FIG. 8C depicts a system. FIG. 8C depicts a system 8C00 as an arrangement of computing modules that are interconnected so as to operate cooperatively to implement any of the herein-disclosed embodiments. Specifically, the embodiment of FIG. 8C implements a portion of a computer system, shown as system 8C00, comprising a computer processor to execute a set of program code instructions (see module 8C10) and modules for accessing memory to hold program code instructions to perform: receiving, by a server over a network, from a requesting client device, a first request for content of a web page wherein the content comprises two or more portions of dynamic content (see module 8B20); performing one or more determining steps, by the server in response to the first request, to determine that the two or more portions of dynamic content are to be processed separately (see module 8B30); and, responsive to the first request and based at least in part on the determining steps, generating a scheduling script to be executed the requestor (see module 8C40) wherein the scheduling script comprises first instructions process a first subset of the two or more dynamic portions of content and second instructions to process at least a second subset of the two or more portions of dynamic content, and wherein the scheduling script, when executed by requesting client device, causes the first subset and the second subset to be processed non-concurrently such that at least the first subset is processed even before the second subset is retrieved.

System Architecture Overview
Additional System Architecture Examples

FIG. 9A depicts a block diagram of an instance of a computer system 9A00 suitable for implementing embodiments of the present disclosure. Computer system 9A00 includes a bus 906 or other communication mechanism for communicating information, which interconnects subsystems and devices such as a processor 907, a system memory (e.g., main memory 908, or an area of random access memory RAM), a static storage device (e.g., ROM 909), an internal or external storage device 910 (e.g., magnetic or optical), a data interface 933, a communication interface 914 (e.g., PHY, MAC, Ethernet interface, modem, etc.), a display 911 (e.g., CRT or LCD), input devices 912 (e.g., keyboard, cursor control), and an external data repository 931.

According to an embodiment of the disclosure, computer system 9A00 performs specific operations by processor 907 executing one or more sequences of one or more instructions contained in system memory. Such instructions may be read into system memory from another computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based or can be formed using a combination of hardware and software that implements logic, and/or can carry out computations and/or processing steps using one or more processes and/or one or more tasks and/or one or more threads or any combination therefrom.

According to an embodiment of the disclosure, computer system 9A00 performs specific networking operations using one or more instances of communication interface 914. Instances of the communication interface 914 may comprise one or more networking ports that are configurable (e.g., pertaining to speed, protocol, physical layer characteristics, media access characteristics, etc.) and any particular instance of the communication interface 914 or port thereto can be configured differently from any other particular instance. Portions of a communication protocol can be carried out in whole or in part by any instance of the communication interface 914, and data (e.g., packets, data structures, bit fields, etc.) can be positioned in storage locations within communication interface 914, or within system memory, and such data can be accessed (e.g., using random access addressing, or using direct memory access DMA, etc.) by devices such as processor 907.

The communications link 915 can be configured to transmit (e.g., send, receive, signal, etc.) communications packets 938 comprising any organization of data items. The data items can comprise a payload data area 937, a destination address 936 (e.g., a destination IP address), a source address 935 (e.g., a source IP address), and can include various encodings or formatting of bit fields to populate the shown packet characteristics 934. In some cases the packet characteristics include a version identifier, a packet or payload length, a traffic class, a flow label, etc. In some cases the payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to processor 907 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data. Such data can be stored, for example, in any form of external data repository 931, which in turn can be formatted into any one or more storage areas, and which can comprise parameterized storage 939 accessible by a key (e.g., filename, table name, block address, offset address, etc.).

In an embodiment of the disclosure, execution of the sequences of instructions to practice the disclosure is performed by a single instance of the computer system 9A00. According to certain embodiments of the disclosure, two or more instances of computer system 9A00 coupled by a communications link 915 (e.g., LAN, PTSN, or wireless network) may perform the sequence of instructions required to practice embodiments of the disclosure using two or more instances of components of computer system 9A00.

The computer system 9A00 may transmit and receive messages, data, and instructions including programs (e.g., application code), through communications link 915 and communication interface 914. Received program code may be executed by processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

The partition 9A01 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a processor 907. Some embodiments include one or more special-purpose hardware components (e.g., power control, logic, sensors, transducers, etc.). A module may include one or more state machines and/or combinational logic used to implement or facilitate the performance characteristics of reducing web page load latency by scheduling sets of successive outgoing HTTP calls.

Various implementations of the database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of reducing web page load latency by scheduling sets of successive outgoing HTTP calls). Such files or records can be brought into and/or stored in volatile or non-volatile memory.

Figure 9B:
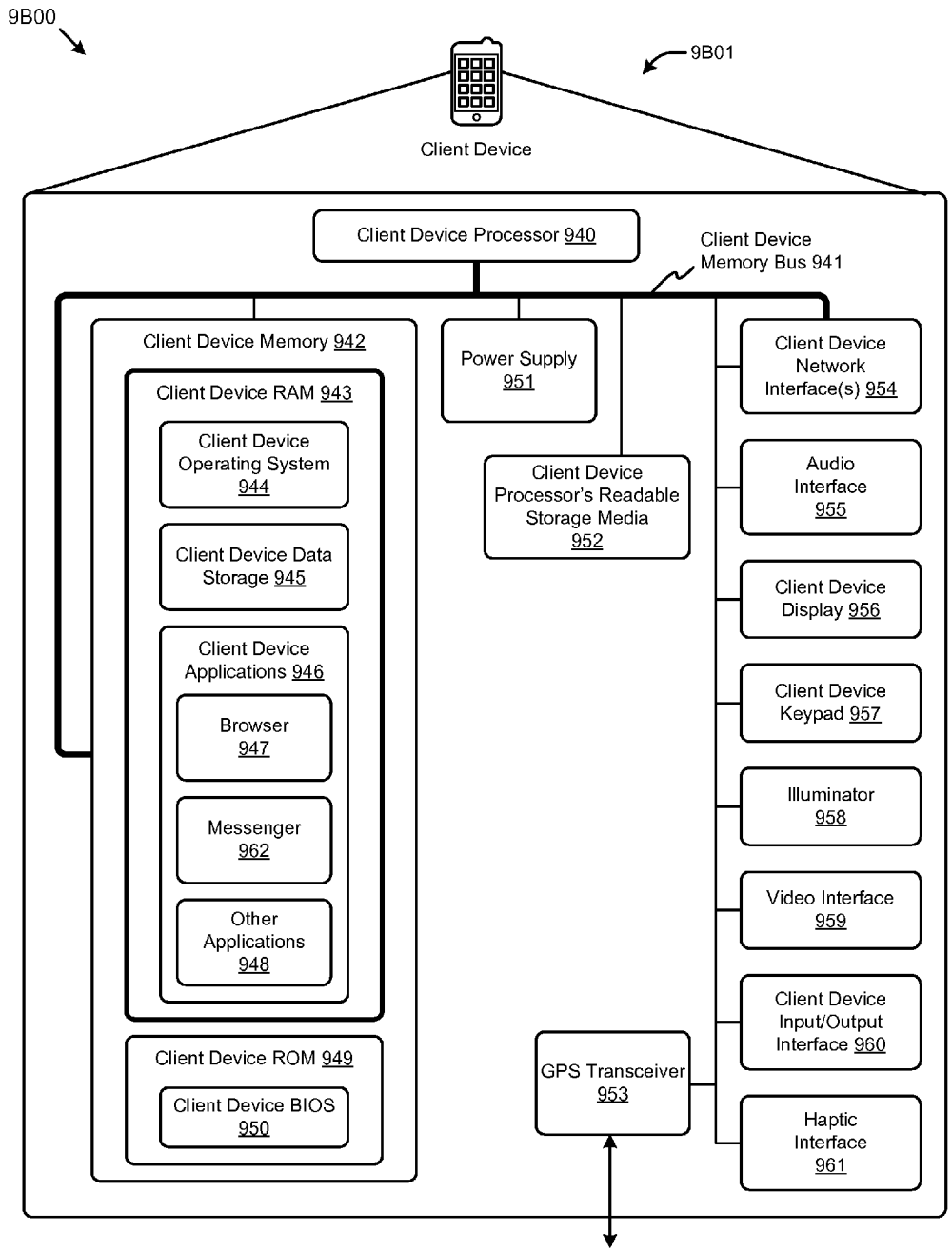

FIG. 9B depicts a block diagram 9B00 of an instance of a client device 9B01 that may be included in a system implementing instances of the herein-disclosed embodiments. Client device 9B01 may include many more or fewer components than those shown in FIG. 9B. Client device 9B01 may represent, for example, an embodiment of at least one of client devices as heretofore disclosed.

As shown in the figure, client device 9B01 includes a client device processor 940 in communication with a client device memory 942 via a client device memory bus 941. Client device 9B01 also includes a power supply 951, one or more client device network interfaces 954, an audio interface 955, a client device display 956, a client device keypad 957, an illuminator 958, a video interface 959, a client device IO interface 960, a haptic interface 961, and a GPS transceiver 953 for global positioning services.

The power supply 951 provides power to client device 9B01. A rechargeable or non-rechargeable battery may be used to provide power. The power may also be provided by an external power source such as an AC adapter or a powered docking cradle that supplements and/or recharges a battery.

A client device 9B01 may optionally communicate with a base station, or directly with another computing device. A client device network interface 954 includes circuitry for coupling a client device 9B01 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), short message service (SMS), general packet radio service (GPRS), wireless access protocol (WAP), ultra wide band (UWB), IEEE 802.16 Worldwide Interoperability for Microwave Access (WiMax), session initiated protocol/real-time transport protocol (SIP/RTP), or any of a variety of other wireless communication protocols. Client device network interface 954 is sometimes known as a transceiver, a transceiving device, or a network interface card (NIC).

An audio interface 955 is arranged to produce and receive audio signals such as the sound of a human voice. For example, audio interface 955 may be coupled to a speaker and microphone to enable telecommunication with others and/or generate an audio acknowledgement for some action.

A client device display 956 may be a liquid crystal display (LCD), gas plasma, light emitting diode (LED), or any other type of display used with a computing device. A client device display 956 may also include a touch sensitive screen arranged to receive input from an object such as a stylus or a digit from a human hand.

A client device keypad 957 may comprise any input device arranged to receive input from a user. For example, client device keypad 957 may include a push button numeric dial, or a keyboard. A client device keypad 957 may also include command buttons that are associated with selecting and sending images.

An illuminator 958 may provide a status indication and/or provide light. Illuminator 958 may remain active for specific periods of time or in response to events. For example, when the illuminator 958 is active, it may backlight the buttons on client device keypad 957 and stay on while the client device is powered. Also, the illuminator 958 may backlight these buttons in various patterns when particular actions are performed such as dialing another client device. An illuminator 958 may also cause light sources positioned within a transparent or translucent case of the client device to illuminate in response to actions.

A video interface 959 is arranged to capture video images such as a still photo, a video segment, an infrared video or the like. For example, the video interface 959 may be coupled to a digital video camera, a web-camera or the like. A video interface 959 may comprise a lens, an image sensor, and other electronics. Image sensors may include a complementary metal-oxide-semiconductor (CMOS) integrated circuit, charge-coupled device (CCD), or any other integrated circuit for sensing light.

Some instances of the shown client device 9B01 comprise a client device IO interface 960 for communicating with external devices such as a headset, or other input or output devices not shown in FIG. 9B. The client device IO interface 960 can use one or more communication technologies such as a USB, infrared, Bluetooth™ port or the like. A haptic interface 961 is arranged to as a human interface device (HID) to facilitate interaction with a user of a client device. Such interaction can include tactile feedback to a user of the client device. For example, the haptic interface 961 may be employed to cause vibration of the client device 9B01 in a particular way (e.g., with a pattern or periodicity) and/or when interacting with one or another user.

A GPS transceiver 953 can determine the physical coordinates of client device 9B01 on the surface of the Earth. The GPS transceiver 953, in some embodiments, may be optional. The shown GPS transceiver 953 outputs a location such as a latitude value and a longitude value. However, the GPS transceiver 953 can also employ other geo-positioning mechanisms including, but not limited to, triangulation, assisted GPS (AGPS), enhanced observed time difference (E-OTD), cell identifier (CI), service area identifier (SAI), enhanced timing advance (ETA), base station subsystem (BSS) or the like, to determine the physical location of client device 9B01 on the surface of the Earth. It is understood that under different conditions, a GPS transceiver 953 can determine a physical location within millimeters for client device 9B01; and in other cases, the determined physical location may be less precise such as within a meter or significantly greater distances. In certain embodiments, the client device 9B01 may provide other information that may be employed to determine a physical location of the device including, for example, a media access control (MAC) address, IP address, IP port identifier, or the like.

The client device memory 942 includes random access memory 943, read-only memory 949, and other storage means. The client device memory 942 illustrates an example of computer readable storage media (devices) for storage of information such as computer readable instructions, data structures, program modules or other data. The client device memory 942 stores a basic IO system (BIOS) in the embodiment of client device BIOS 950 for controlling low-level operation of client device 9B01. The memory also stores an operating system 944 for controlling the operation of client device 9B01. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the Symbian® operating system. The operating system may include, or interface with a Java virtual machine module that enables control of hardware components and/or operating system operations via Java application programs.

The client device memory 942 further includes one or more instances of client device data storage 945, which can be used by client device 9B01 to store, among other things, client device applications 946 and/or other data. For example, client device data storage 945 may also be employed to store information that describes various capabilities of client device 9B01. The information may then be provided to another device based on any of a variety of events including being sent as part of a header during a communication, sent upon request or the like. Client device data storage 945 may also be employed to store social networking information including address books, buddy lists, aliases, user profile information or the like. Further, client device data storage 945 may also store messages, web page content, or any of a variety of content (e.g., received content, user generated content, etc.).

At least a portion of the information may also be stored on any component or network device including, but not limited, to a client device processor's readable storage media, a disk drive or other computer readable storage devices within client device 9B01, etc.

An instance of a client device processor readable storage media 952 may include volatile, nonvolatile, removable, and non-removable media implemented in any method or technology for storage of information such as computer- or processor-readable instructions, data structures, program modules, or other data. Examples of computer readable storage media include RAM, ROM, electrically erasable programmable read-only memory (EEPROM), flash memory or other memory technology, Compact disc read-only memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. The aforementioned readable storage media may also be referred to herein as computer readable storage media.

The client device applications 946 may include computer executable instructions which, when executed by client device 9B01, transmit, receive, and/or otherwise process network data. The network data may include, but is not limited to, messages (e.g., SMS, multimedia message service (MMS), instant message (IM), email, and/or other messages), audio, video, and enable telecommunication with another user of another client device. Client device applications 946 may include, for example, a messenger 962, a browser 947, and other applications 948. Certain other applications 948 may include, but are not limited to, calendars, search programs, email clients, IM applications, SMS applications, voice over Internet protocol (VOIP) applications, contact managers, task managers, transcoders, database programs, word processing programs, security applications, spreadsheet programs, games, search programs, and so forth. In some embodiments, other applications 948 may collect and store user data that may be received from other computing devices in the environment.

A messenger 962 may be configured to manage a messaging session using any of a variety of messaging communications including, but not limited to email, SMS, IM, MMS, internet relay chat (IRC), Microsoft IRC (mIRC), really simple syndication (RSS) feeds, and/or the like. For example, in certain embodiments, the messenger 962 may be configured as an IM application such as AOL (America Online) instant messenger, Yahoo! messenger, .NET messenger server, ICQ or the like. In certain embodiments, the messenger 962 may be configured to include a mail user agent (MUA) such as Elm, Pine, message handling (MH), Outlook, Eudora, Mac Mail, Mozilla Thunderbird or the like. In another embodiment, the messenger 962 may be a client device application that is configured to integrate and employ a variety of messaging protocols including, but not limited, to various push and/or pull mechanisms for client device 9B01. In certain embodiments, the messenger 962 may interact with the browser 947 for managing messages. As used herein, the term "message" refers to any of a variety of messaging formats, or communications form including, but not limited to, email, SMS, IM, MMS, IRC or the like.

A browser 947 may include virtually any application configured to receive and display graphics, text, multimedia, messages and the like, employing virtually any web based language. In certain embodiments, the browser application is enabled to employ HDML, WML, WMLScript, JavaScript, SGML, HTML, XML and the like, to display and send a message. However, any of a variety of other web-based programming languages may be employed. In certain embodiments, a browser 947 may enable a user of client device 9B01 to communicate with another network device as may be present in the environment.

Figure 9C:
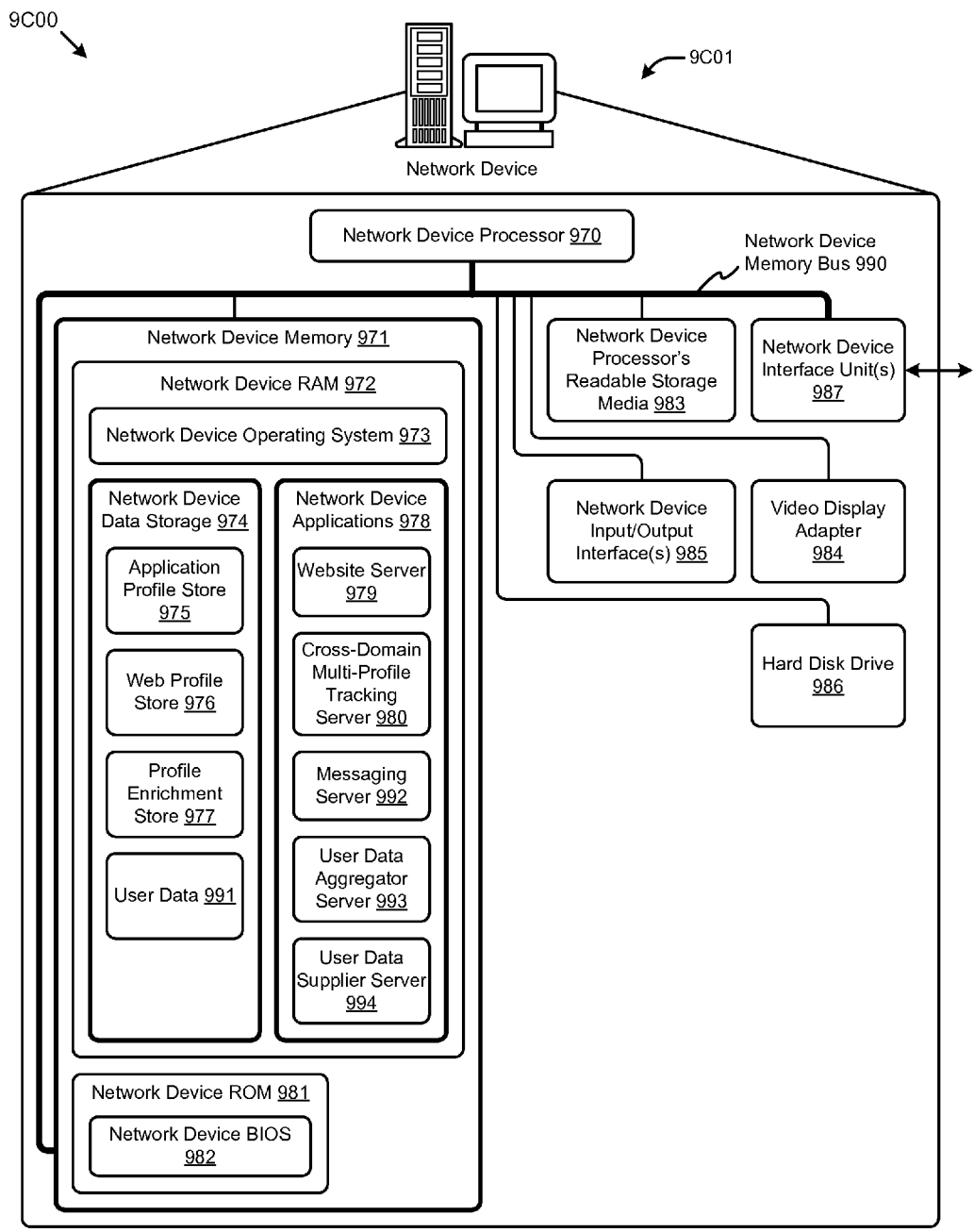

FIG. 9C depicts a block diagram 9C00 of an instance of a network device 9C01 that may be included in a system implementing instances of the herein-disclosed embodiments. Network device 9C01 may include many more or fewer components than those shown. Network device 9C01 may be configured to operate as a server, client, peer, a host, or any other device.

The network device 9C01 includes at least one instance of a network device processor 970, instances of network device processor readable storage media 983, network interface(s), a network device IO interface 985, a hard disk drive 986, a video display adapter 984, and a network device memory 971, all in communication with each other via a network device memory bus 990. The network device memory generally includes network device RAM 972, network device ROM 981. Some embodiments include one or more non-volatile mass storage devices such as a hard disk drive 986, a tape drive, an optical drive, and/or a floppy disk drive. The network device memory stores a network device operating system 973 for controlling the operation of network device 9C01. Any general-purpose operating system may be employed. A basic input/output system (BIOS) is also provided in the form of network device BIOS 982 for controlling the low-level operation of network device 9C01. As illustrated in FIG. 9C, a network device 9C01 also can communicate with the Internet, or some other communications network, via a network interface unit 987, which is constructed for use with various communication protocols including the TCP/IP protocol. The network interface unit is sometimes known as a transceiver, a transceiving device, or a network interface card (NIC). Network device 9C01 also comprises a network device IO interface 985 for communicating with external devices such as a keyboard or other input or output devices. A network device IO interface 985 can use one or more communication technologies such as USB, infrared, Bluetooth™ or the like.

The storage devices as described above may use various types of computer readable media, namely non-volatile computer readable storage media and/or a client device processor's readable storage media and/or a network device processor's readable storage media. Such media may include any combinations of volatile, nonvolatile, removable, and non-removable media implemented in any method or technology for storage of information such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

As shown, network device data storage 974 may include a database, text storage, a spreadsheet, a folder or directory hierarchy, a file or files or the like that may be configured to maintain and store user account identifiers, user profiles, email addresses, IM addresses, and/or other network addresses or the like. Network device data storage 974 may further include program code, data, algorithms and the like, for use by a processor such as a network device processor 970 to execute and perform actions. In certain embodiments, at least some of the logical contents of network device data storage 974 might be stored on another component of network device 9C01, such as on a second instance of hard disk drive 986 or on an external/removable storage device.

The network device data storage 974 may further store any portions of application data and/or user data such as an application profile store 975, a web profile store 976, a profile enrichment store 977 and/or any user data collected. In some embodiments, user data 991 may store unique user data, non-unique user data, aggregated user data, and/or any combination thereof. User data 991 may include a variety of attributes such as a five digit zip code, an expanded nine digit zip code and the like.

The Network device data storage 974 may also store program code and data. One or more network device applications 978 may be loaded into network device data storage or any other mass memory, to be accessible to run with or as a part of network device operating system 973. Examples of network device application programs may include transcoders, schedulers, calendars, database programs, word processing programs, hypertext transfer protocol (HTTP) programs, customizable user interface programs, IPSec applications, encryption programs, security programs, SMS message servers, IM message servers, email servers, account managers, and so forth. A messaging server 992, website server 979, user data aggregator server 993, a cross-domain multi-profile tracking server 980, and/or user data supplier server 994 may also be included within or implemented as application programs.

A messaging server 992 may include virtually any computing component or components configured and arranged to forward messages from message user agents and/or other message servers, or to deliver messages to a local message store such as network device data storage 974 or the like. Thus, a messaging server 992 may include a message transfer manager to communicate a message employing any of a variety of email protocols including, but not limited to, simple mail transfer protocol (SMTP), post office protocol (POP), Internet message access protocol (IMAP), network new transfer protocol (NNTP) or the like. A messaging server 992 may also be managed by one or more components of the messaging server 992. Thus, the messaging server 992 may also be configured to manage SMS messages; IM, MMS, IRC, or RSS feeds; mIRC; or any of a variety of other message types. In certain embodiments, the messaging server 992 may enable users to initiate and/or otherwise conduct chat sessions, VOIP sessions or the like.

A website server 979 may represent any of a variety of information and services that are configured to provide content, including messages, over a network to another computing device. Thus, a website server 979 can include, for example, a web server, a file transfer protocol (FTP) server, a database server, a content server or the like. A website server 979 may provide the content including messages over the network using any of a variety of formats including, but not limited to WAP, HDML, WML, SGML, HTML, XML, compact HTML (cHTML), extensible HTML (xHTML) or the like. A website server 979 may also be configured to enable a user of a client device to browse websites, upload user data, view and interact with advertisements or the like.

A user data aggregator server 993 is configured to aggregate user data to be provided to user data buyers for advertising campaigns. In certain embodiments, a user data aggregator server 993 may be configured to receive collected user data from a user data supplier server 994. In some embodiments, a user data aggregator server 993 may receive a query for user data. Based on the query, a user data aggregator server 993 may generate a plurality of subsets of aggregated user data. In some embodiments, user data aggregator server 993 may be included in a network device.

A user data supplier server 994 is configured to collect user data. In certain embodiments, the user data supplier server 994 may be configured to provide the collected user data to user data aggregator server 993. In some embodiments, the user data supplier server 994 may collect and/or provide unique user data and/or non-unique user data. In certain embodiments, the user data supplier server 994 may aggregate the collected user data. In some embodiments, the user data supplier server 994 may be included in any computing device such as heretofore described.

Returning to discussion of the heretofore introduced environments, the environments includes components with which various systems can be implemented. Not all of the components shown may be required to practice the embodiments, and variations in the arrangement and type of the components may be made without departing from the spirit or scope of the disclosure.

Various environment in which embodiments of the disclosure operate may include local area networks (LANs)/wide area networks (WANs), wireless networks, client devices (e.g., user stations). The overall network, including any sub-networks and/or wireless networks, are in communication with, and enables communication between components in the environment.

Instances of client devices may include virtually any computing device capable of communicating over a network to send and receive information, including instant messages, performing various online activities or the like. It should be recognized that more or fewer client devices may be included within a system such as described herein, and embodiments are therefore not constrained by the number or type of client devices employed.

Devices that may operate as client devices may include devices that can connect using a wired or wireless communications medium such as personal computers, servers, multiprocessor systems, microprocessor-based or programmable consumer electronics, network PCs or the like. In some embodiments, client devices may include virtually any portable computing device capable of connecting to another computing device and receiving information such as a laptop computer, a smart phone, a tablet computer, or the like. Portable or mobile computer devices are may also include or operate in conjunction with other portable devices such as cellular telephones, display pagers, radio frequency (RF) devices, infrared (IR) devices, personal digital assistants (PDAs), handheld computers, wearable computers integrated devices combining one or more of the preceding devices and the like. As such, client devices can range widely in terms of capabilities and features. Moreover, client devices may provide access to various computing applications including a browser or other web-based applications. A web-enabled client device may include a browser application that is configured to receive and to send web pages, web-based messages and the like. The browser application may be configured to receive and display graphics, text, multimedia and the like, employing virtually any web-based language including a wireless application protocol messages (WAP) and the like. In certain embodiments, the browser application is enabled to employ handheld device markup language (HDML), wireless markup language (WML), WMLScript, JavaScript, standard generalized markup language (SGML), HyperText markup language (HTML), eXtensible markup language (XML) and the like, to display and send a message. In certain embodiments, a user of the client device may employ the browser application to perform various activities over a network (online). However, another application may also be used to perform various online activities.

Client devices may include at least one client application that is configured to receive and/or send data between another computing device (e.g., a server component). The client application may include a capability to provide send and/or receive content or the like. The client application may further provide information that identifies itself including a type, capability, name or the like. In certain embodiments, a client device may uniquely identify itself through any of a variety of mechanisms including a phone number, mobile identification number (MIN), an electronic serial number (ESN), or other mobile device identifier. The information may also indicate a content format that the mobile device is enabled to employ. Such information may be provided in a network packet or the like, sent between other client devices, or sent between other computing devices.

Client devices may be further configured to include a client application that enables an end-user to log into an end-user account that may be managed by another computing device. Such end-user accounts, in one non-limiting example, may be configured to enable the end-user to manage one or more online activities including, in one non-limiting example, search activities, social networking activities, browse various websites, communicate with other users, participate in gaming, interact with various applications or the like. However, participation in online activities may also be performed without logging into the end-user account.

A wireless communication capability is configured to couple client devices and other components with network. Wireless network may include any of a variety of wireless sub-networks that may further overlay stand-alone and/or ad-hoc networks and the like, to provide an infrastructure-oriented connection for client devices. Such sub-networks may include mesh networks, wireless LAN (WLAN) networks, cellular networks and the like. In certain embodiments, the system may include more than one wireless network.

A wireless network may further include an autonomous system of terminals, gateways, routers, mobile network edge devices and the like which may be connected by wireless radio links, etc. Connections may be configured to move freely and randomly and organize themselves arbitrarily such that the topology of a wireless network may change rapidly. A wireless network may further employ a plurality of access technologies including AMPS and/or second generation (2G), and/or third generation (3G), and/or fourth generation (4G) generation radio access for cellular systems, WLAN, wireless router (WR) mesh and the like. The foregoing access technologies as well as emerging and/or future access technologies may enable wide area coverage for mobile devices such as client devices with various degrees of mobility. In one non-limiting example, wireless network may enable a radio connection through a radio network access such as a global system for mobile (GSM) communication, general packet radio services (GPRS), enhanced data GSM environment (EDGE), wideband code division multiple access (WCDMA) and the like. A wireless network may include any wireless communication mechanism by which information may travel between client devices and/or between any other computing devices and/or between or over other networks or network components.

Any of the foregoing networks can be configured to couple network devices with other computing devices and communication can include communicating over the Internet. In some situations communication is carried out using combinations of LANs, WANs, as well as direct connections such as through a universal serial bus (USB) port, other forms of computer readable media. On an interconnected set of LANs, including those based on differing architectures and protocols, a router acts as a link between LANs, enabling messages to be sent from one to another. In addition, communication links within LANs may include twisted wire pair or coaxial cable, while communication links between networks may use analog telephone lines, full or fractional dedicated digital lines including T1, T2, T3, and T4, and/or other carrier mechanisms including, for example, E-carriers, integrated services digital networks (ISDNs), digital subscriber lines (DSLs), wireless links including satellite links, or other communications links known to those skilled in the art. Moreover, communication links may further employ any of a variety of digital signaling technologies including, without limit, for example, DS-0, DS-1, DS-2, DS-3, DS-4, OC-3, OC-12, OC-48 or the like. Furthermore, remote computers and other related electronic devices can be remotely connected to either LANs or WANs via a modem and temporary telephone link. In various embodiments, network 108 may be configured to transport information of an Internet protocol (IP). In some cases, communication media carries computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
receiving, by a server, a first request from a client device for content of a web page, wherein the content comprises a static portion and two or more portions of dynamic content, and wherein the static portion includes content having been previously determined to be displayed for each rendering of the web page and dynamic content is configured to be identified at each rendering based on browsing activities corresponding to a session;
determining, by the server in response to the first request, that the two or more portions of dynamic content are to be processed separately; and
generating, in response to the first request and based at least in part on the determining, a scheduling script to be executed by the client device,
wherein the scheduling script is configured to be executed after the static portion of the web page has rendered and includes first instructions to process a first portion of the two or more portions of dynamic content and second instructions to process at least a second portion of dynamic content of the two or more portions of dynamic content; and
wherein the scheduling script, when executed by the client device, causes the first instructions to render a first portion of dynamic content of the two or more portions of dynamic content at a first time after the static portion of the web page has rendered and causes the second instructions to render at least the second portion of dynamic content at a second time, the second time following a delay after the first time.

2. The method of claim 1, wherein determining that the two or more portions of dynamic content are to be processed separately comprises accessing one or more policies.

3. The method of claim 2, wherein the one or more policies comprise at least one of an auction limit per page load, a content time on page, a list of selected advertiser partners, and a web page load time.

4. The method of claim 3, wherein one or more of the policies are selected at a management user interface.

5. The method of claim 1, wherein processing at least the second portion of dynamic content is deferred when the client device navigates away from the web page.

6. The method of claim 5, wherein processing at least the second portion of dynamic content is canceled based on a DOM event.

7. The method of claim 1, wherein processing the first portion of dynamic content and at least the second portion of dynamic content are related by at least one of a time interval and a DOM event.

8. The method of claim 1, wherein at least one of the first portion of dynamic content and at least the second portion of dynamic content comprises at least one beacon that invokes an HTTP call when processed by the client device.

9. The method of claim 1, wherein at least one least one of the first portion of dynamic content and at least the second portion of dynamic content comprises a scheduling function to be executed by the client device.

10. The method of claim 1, wherein processing of at least the second portion of dynamic content is invoked by a DOM event.

11. A computer program product, embodied in a non-transitory computer readable medium, the computer readable medium having stored thereon a sequence of instructions which, when executed by a processor causes the processor to execute a process, the process comprising:
receiving, by a server, a first request from a client device for content of a web page, wherein the content comprises a static portion and two or more portions of dynamic content, and wherein the static portion includes content having been previously determined to be displayed for each rendering of the web page and dynamic content is configured to be identified at each rendering based on browsing activities corresponding to a session;
determining, by the server in response to the first request, that the two or more portions of dynamic content are to be processed separately; and
generating, in response to the first request and based at least in part on the determining, a scheduling script to be executed by the client device,
wherein the scheduling script is configured to be executed after the static portion of the web page has rendered and includes first instructions to process a first portion of the two or more portions of dynamic content and second instructions to process at least a second portion of dynamic content of the two or more portions of dynamic content; and
wherein the scheduling script, when executed by the client device, causes the first instructions to render a first portion of dynamic content of the two or more portions of dynamic content at a first time after the static portion of the web page has rendered and causes the second instructions to render at least the second portion of dynamic content at a second time, the second time following a delay after the first time.

12. The computer program product of claim 11, wherein determining that the two or more portions of dynamic content are to be processed separately comprises accessing one or more policies.

13. The computer program product of claim 12, wherein the one or more policies comprise at least one of an auction limit per page load, a content time on page, a list of selected advertiser partners, and a web page load time.

14. The computer program product of claim 13, wherein one or more of the policies are selected at a management user interface.

15. The computer program product of claim 11, wherein processing at least the second portion of dynamic content is deferred when the client device navigates away from the web page.

16. The computer program product of claim 11, wherein at least one of the first portion of dynamic content and at least the second portion of dynamic content comprises at least one beacon that invokes an HTTP call when processed by the client device.

17. The computer program product of claim 11, wherein at least of the first portion of dynamic content and at least the second portion of dynamic content comprises a scheduling function to be executed by the client device.

18. The computer program product of claim 11, wherein processing of at least the second portion of dynamic content is invoked by a DOM event.

19. A system comprising:
a server including at least one processor and at least one memory, wherein the server includes a request processing module to receive, from a client device, a first request for content of a web page, wherein the content comprises a static portion and two or more portions of dynamic content, and wherein the static portion includes content having been previously determined to be displayed for each rendering of the web page and dynamic content is configured to be identified at each rendering based on browsing activities corresponding to a session;
a content scheduling engine to determine, in response to the first request, that the two or more portions of dynamic content are to be processed separately; and
a content delivery module to generate a scheduling script to be executed by the client device, wherein generation of the scheduling script is responsive to the first request and based at least in part on the determination that the two or more portions of dynamic content are to be processed separately, and
wherein the scheduling script is configured to be executed after the static portion of the web page has rendered and includes first instructions to process a first portion of the two or more portions of dynamic content and second instructions to process at least a second portion of dynamic content of the two or more portions of dynamic content; and
wherein the scheduling script, when executed by the client device, causes the first instructions to render a first portion of dynamic content of the two or more portions of dynamic content at a first time after the static portion of the web page has rendered and causes the second instructions to render at least the second portion of dynamic content at a second time, the second time following a delay after the first time.

20. The system claim 19, further comprising a content schedule storage area to provide access to one or more policies.

* * * * *

UNITED STATES PATENT AND TRADEMARK OFFICE
CERTIFICATE OF CORRECTION

PATENT NO. : 9,723,057 B2
APPLICATION NO. : 14/694787
DATED : August 1, 2017
INVENTOR(S) : Wiener et al.

Page 1 of 1

It is certified that error appears in the above-identified patent and that said Letters Patent is hereby corrected as shown below:

On the Title Page

Column 1, under Other Publications, Line 2, delete "Activo-Magneto" and insert -- Activo-Magento --, therefor.

In the Specification

In Column 3, Line 4, delete "content," and insert -- content. --, therefor.

In Column 10, Line 8, delete "1502)" and insert -- $150_2$) --, therefor.

In Column 18, Line 66, delete "PTSN," and insert -- PSTN, --, therefor.

In the Claims

In Column 28, Line 32, in Claim 9, delete "least one least one" and insert -- least one --, therefor.

In Column 29, Line 28, in Claim 17, delete "least of" and insert -- least --, therefor.

In Column 30, Line 34, in Claim 20, after "system" insert -- of --.

Signed and Sealed this
Tenth Day of April, 2018

Andrei Iancu
*Director of the United States Patent and Trademark Office*